US012189039B2

(12) United States Patent
Gagne

(10) Patent No.: US 12,189,039 B2
(45) Date of Patent: Jan. 7, 2025

(54) THREE-DIMENSIONAL SCANNING USING FIXED PLANAR DISTANCE SENSORS

(71) Applicant: Diversey, Inc., Fort Mill, SC (US)

(72) Inventor: Aurle Gagne, Mechanicsville, VA (US)

(73) Assignee: DIVERSEY, INC., Fort Mill, SC (US)

( * ) Notice: Subject to any disclaimer, the term of this patent is extended or adjusted under 35 U.S.C. 154(b) by 630 days.

(21) Appl. No.: 16/477,349

(22) PCT Filed: Jan. 12, 2018

(86) PCT No.: PCT/US2018/013439
§ 371 (c)(1),
(2) Date: Jul. 11, 2019

(87) PCT Pub. No.: WO2018/132632
PCT Pub. Date: Jul. 19, 2018

(65) Prior Publication Data
US 2019/0361128 A1    Nov. 28, 2019

Related U.S. Application Data

(60) Provisional application No. 62/445,850, filed on Jan. 13, 2017.

(51) Int. Cl.
*G01S 17/931* (2020.01)
*A47L 9/28* (2006.01)
(Continued)

(52) U.S. Cl.
CPC .......... *G01S 17/931* (2020.01); *A47L 9/2826* (2013.01); *G01S 7/4817* (2013.01); *G05D 1/0257* (2013.01); *A47L 2201/04* (2013.01)

(58) Field of Classification Search
CPC ...... G01S 17/931; G01S 7/4817; G01S 7/027; G01S 2013/9323; G01S 2013/9324;
(Continued)

(56) References Cited

U.S. PATENT DOCUMENTS

| 5,279,672 A | 1/1994 | Betker et al. |
| 6,151,539 A | 11/2000 | Bergholz et al. |

(Continued)

FOREIGN PATENT DOCUMENTS

| CN | 204016192 U | 12/2014 |
| DE | 102011053975 A1 | 4/2012 |

(Continued)

OTHER PUBLICATIONS

Fujita, 3D Sensing and Mapping for a Tracked Mobile Robot with a Movable Laser Ranger Finder; World Academy of Science, Engineering and Technology, 62, 2012.

(Continued)

*Primary Examiner* — Russell Frejd
*Assistant Examiner* — Ellis B. Ramirez
(74) *Attorney, Agent, or Firm* — LORENZ & KOPF, LLP

(57) ABSTRACT

A system is capable of three-dimensional scanning in an environment containing a protrusion that extends substantially parallel to a floor. The system includes an autonomous vehicle, a planar distance sensor, and a computing device. The autonomous vehicle is configured to be located on the floor and to move across the floor. The planar distance sensor is fixedly mounted to the autonomous vehicle. A field of the planar distance sensor is at a non-parallel angle with respect to the floor when the autonomous vehicle is on the floor. The field of the planar distance sensor impinges on a surface of the protrusion when the autonomous vehicle is on the floor. The computing device is located on the autonomous vehicle and configured to develop a three-dimensional scan of the protrusion as the autonomous vehicle moves across the floor.

19 Claims, 14 Drawing Sheets

(51) Int. Cl.
*G01S 7/481* (2006.01)
*G05D 1/00* (2024.01)

(58) Field of Classification Search
CPC ...... G01S 13/881; G01S 7/521; G01S 13/931; G01S 15/931; A47L 9/2826; A47L 2201/04; G05D 1/0214; G05D 1/0257
USPC ............ 701/28, 25, 514, 519; 348/113, 116; 901/1; 318/568.12
See application file for complete search history.

(56) References Cited

U.S. PATENT DOCUMENTS

| | | | |
|---|---|---|---|
| 6,906,684 | B2 | 6/2005 | Turner |
| 7,130,730 | B2 | 10/2006 | Strumolo et al. |
| 7,230,640 | B2 | 6/2007 | Regensburger et al. |
| 8,755,997 | B2 | 6/2014 | Au et al. |
| 9,097,800 | B1 | 8/2015 | Zhu |
| 9,097,804 | B1 | 8/2015 | Silver et al. |
| 9,285,464 | B2 | 3/2016 | Pennecot et al. |
| 9,315,192 | B1 | 4/2016 | Zhu et al. |
| 9,342,074 | B2 | 5/2016 | Dolgov et al. |
| 9,383,753 | B1 | 7/2016 | Templeton et al. |
| 9,535,421 | B1* | 1/2017 | Canoso ................ G05D 1/0248 |
| 10,542,859 | B2 | 1/2020 | Lee et al. |
| 10,704,864 | B1 | 7/2020 | Fougnies et al. |
| 2009/0125175 | A1* | 5/2009 | Park ....................... G05D 1/024 701/28 |
| 2010/0053593 | A1 | 3/2010 | Bedros et al. |
| 2010/0235129 | A1 | 9/2010 | Sharma et al. |
| 2012/0185094 | A1* | 7/2012 | Rosenstein .......... G05D 1/0251 700/259 |
| 2013/0226344 | A1* | 8/2013 | Wong ..................... B25J 9/1694 |
| 2015/0081156 | A1 | 3/2015 | Trepagnier et al. |
| 2015/0131080 | A1 | 5/2015 | Retterath et al. |
| 2015/0185313 | A1 | 7/2015 | Zhu |
| 2016/0144505 | A1* | 5/2016 | Fong .................... G05D 1/0274 700/250 |
| 2016/0180177 | A1 | 6/2016 | Nguyen et al. |
| 2016/0313741 | A1* | 10/2016 | Lindhe ................ G05D 1/0274 |
| 2017/0225680 | A1* | 8/2017 | Huang ................. G05D 1/0094 |
| 2018/0021954 | A1* | 1/2018 | Fischer .................. B25J 9/1692 700/253 |
| 2018/0210448 | A1* | 7/2018 | Lee ...................... B25J 11/0085 |
| 2020/0142426 | A1 | 5/2020 | Gist, IV et al. |
| 2021/0089040 | A1* | 3/2021 | Ebrahimi Afrouzi ....................... G05D 1/0248 |

FOREIGN PATENT DOCUMENTS

| | | |
|---|---|---|
| EP | 2774523 A2 | 9/2014 |
| JP | 2014013551 A | 1/2014 |
| WO | 2016/129950 A1 | 8/2016 |
| WO | 2018/017918 A1 | 1/2018 |

OTHER PUBLICATIONS

International Search Report of Patent Application No. PCT/US2018/013439 dated Apr. 26, 2018; 3 pages.
Rojo et al., Spirit of Berlin: An Autonomous Car for the DARPA Urban Challenge Hardware and Software Architecture; Jun. 1, 2007; 25 pages.
Wisspeinter et al., A 3D Laser Scanner System for Intersection Analysis and Autonomous Driving; undated; 1 page.
Harper et al., Technical Paper DARPA Grand Challenge 2005, Team UCF (University of Central Florida); 2005; 13 pages.
Aeschimann et al., Ground or Obstacles? Detecting Clear Paths in Vehicle Navigation; undated; 8 pages.
Tarko et al., "TScan: Stationary LIDAR for Traffic and Safety Studies—Object Detection and Tracking"; Joint Transportation Research Program Publication No. FHWA/IN/JTRP-2016/24. West Lafayette, IN: Purdue University; 98 pages.
Telescopic Masts; RVALM RVA Lighting & Masts Inc .; https://www.rvalm.ca/en/telescopic-masts; 2020, 2 pages.
International Search Report and Written Opinion of Application No. PCT/US2018/021698 mailed Jun. 13, 2018; 12 pages.

* cited by examiner

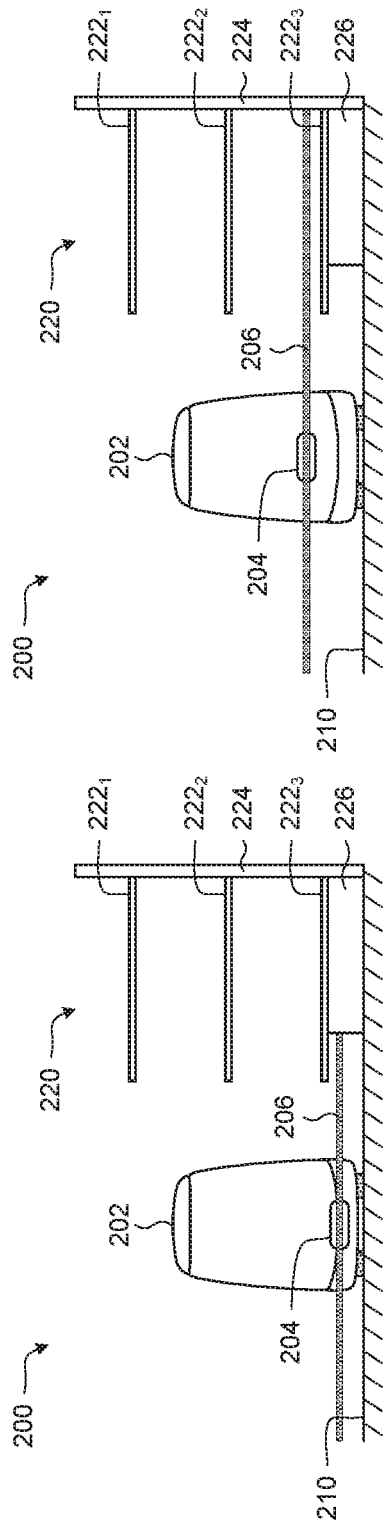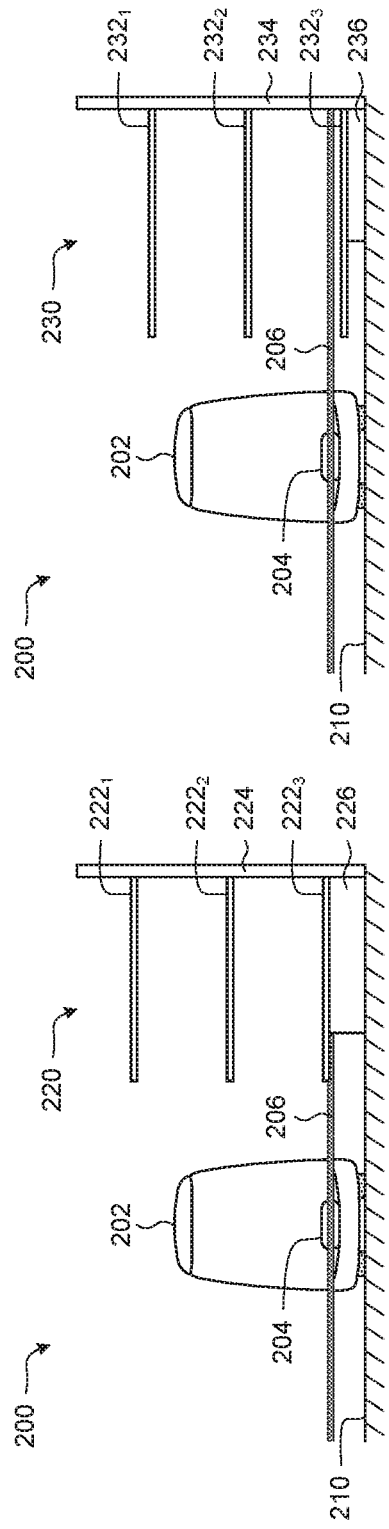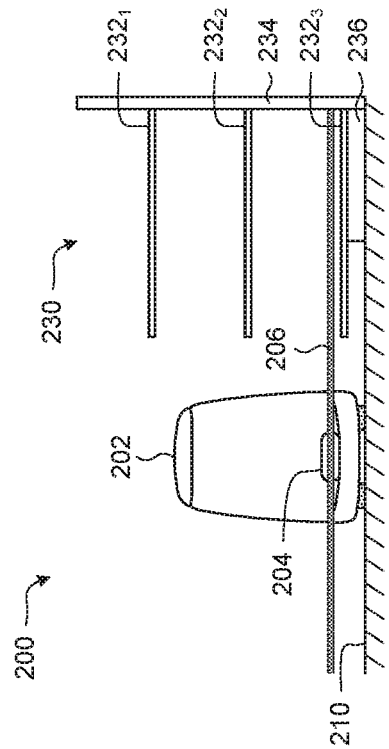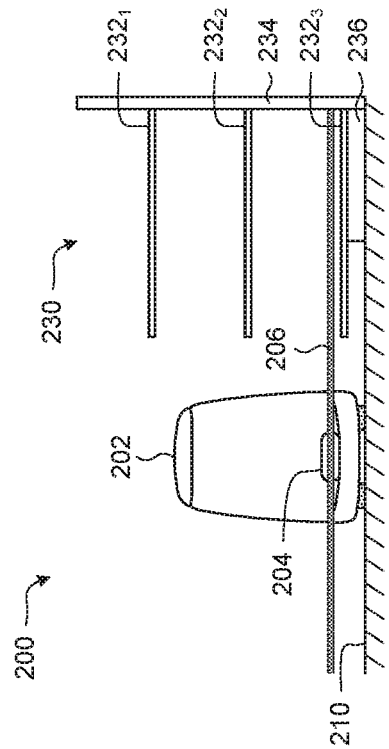

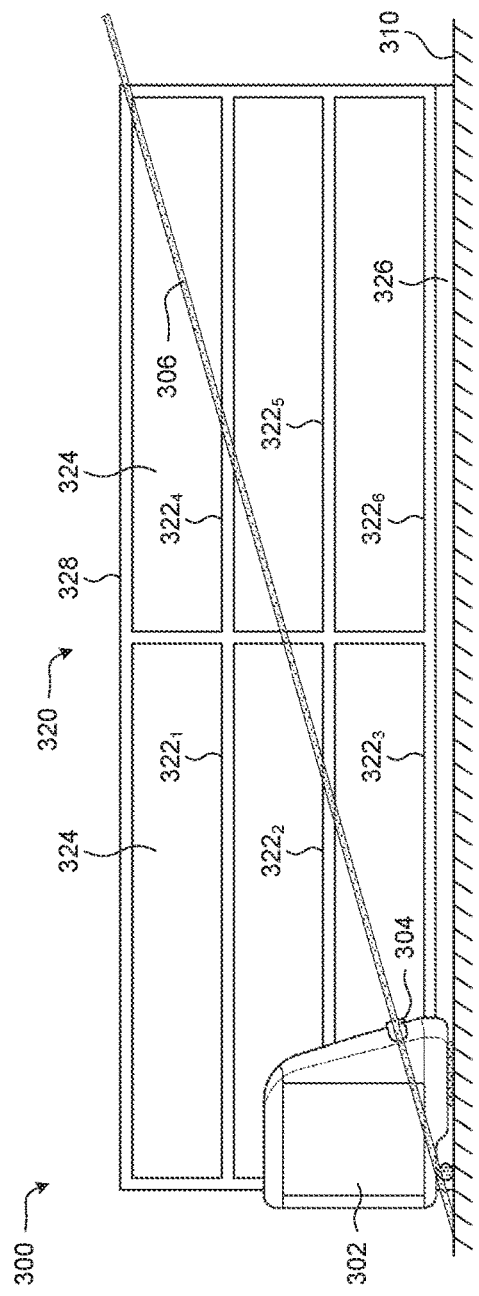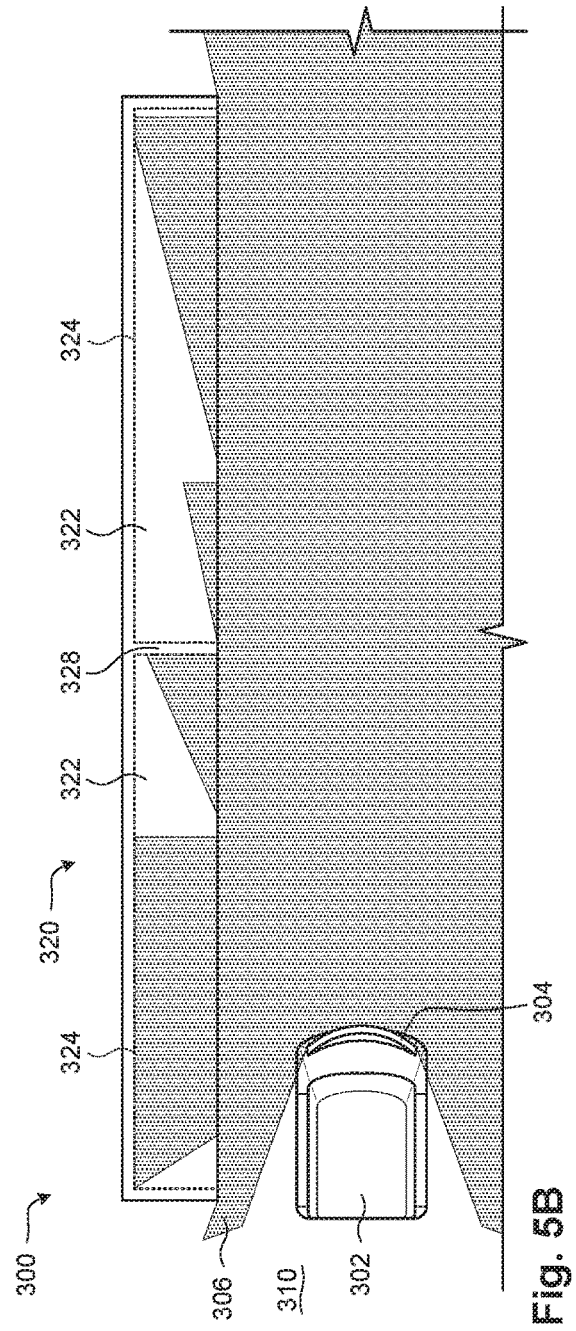

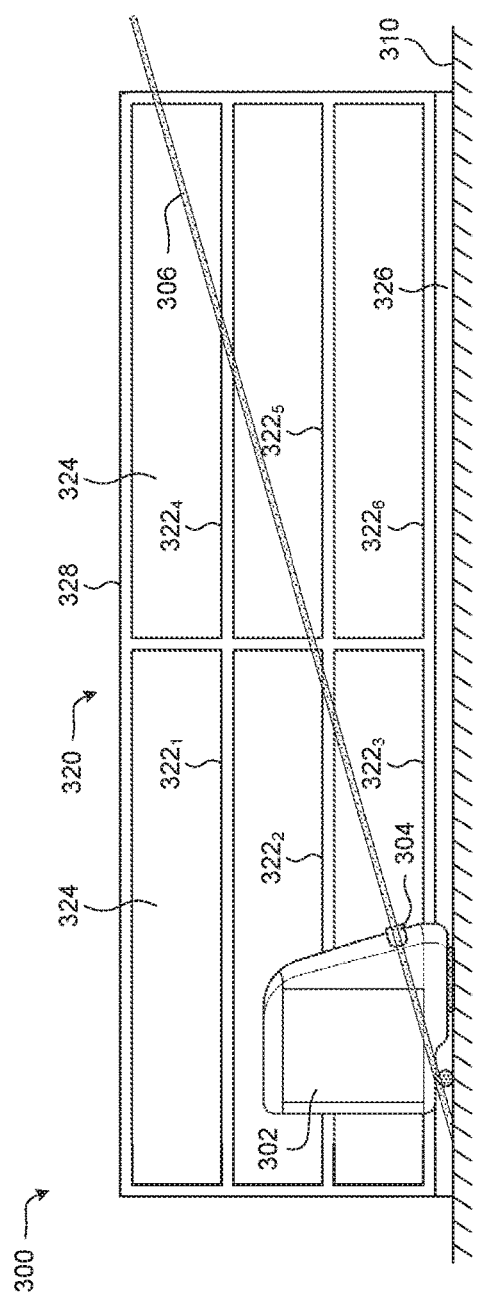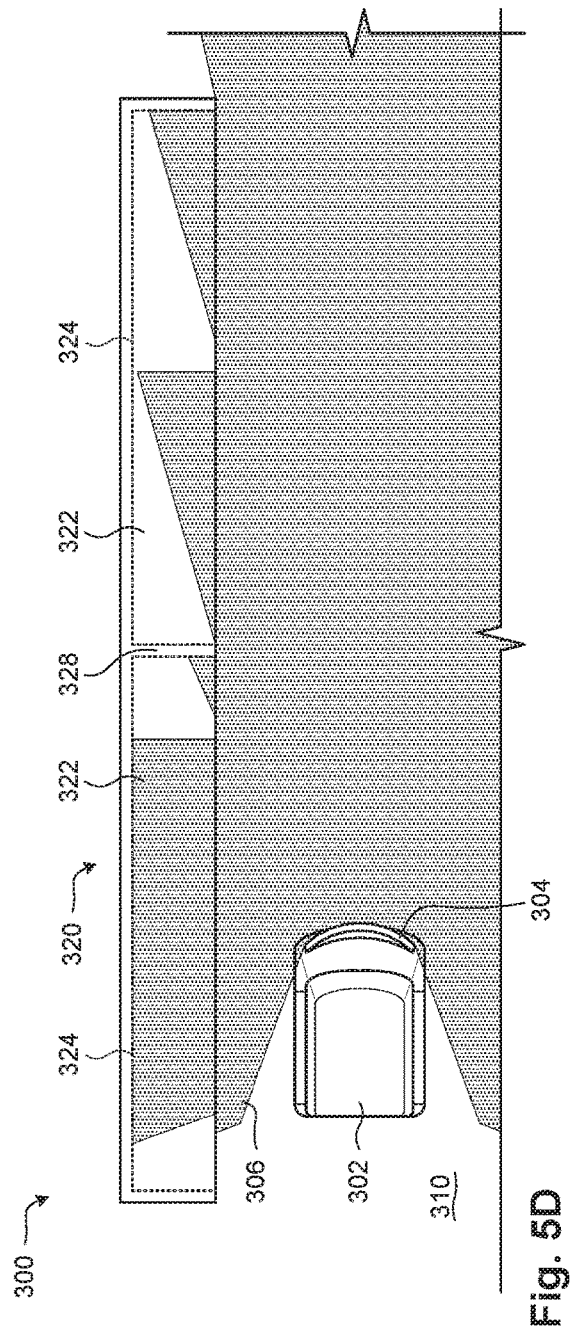

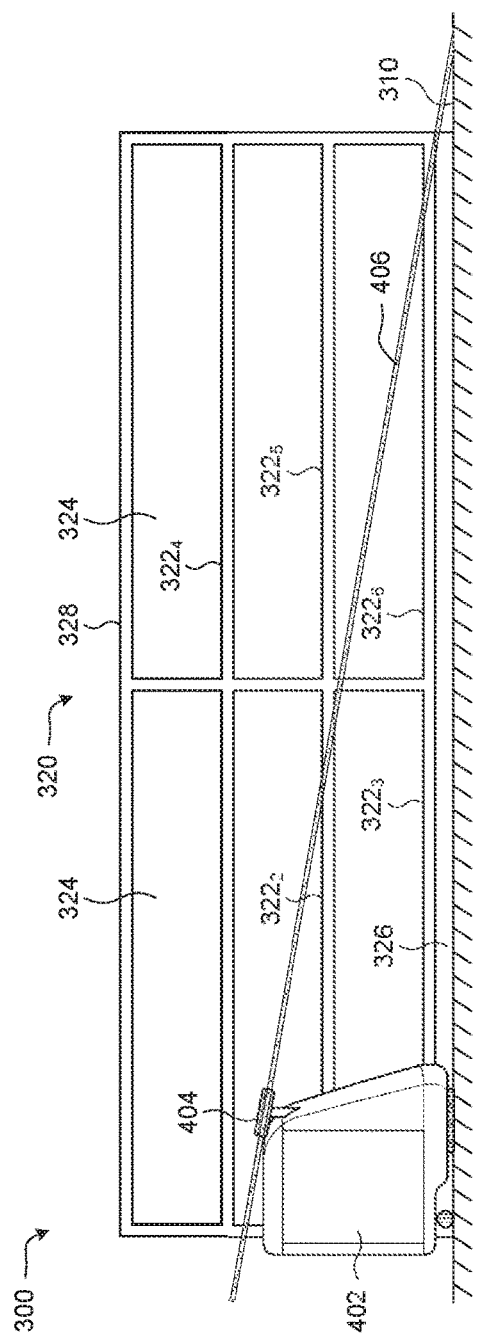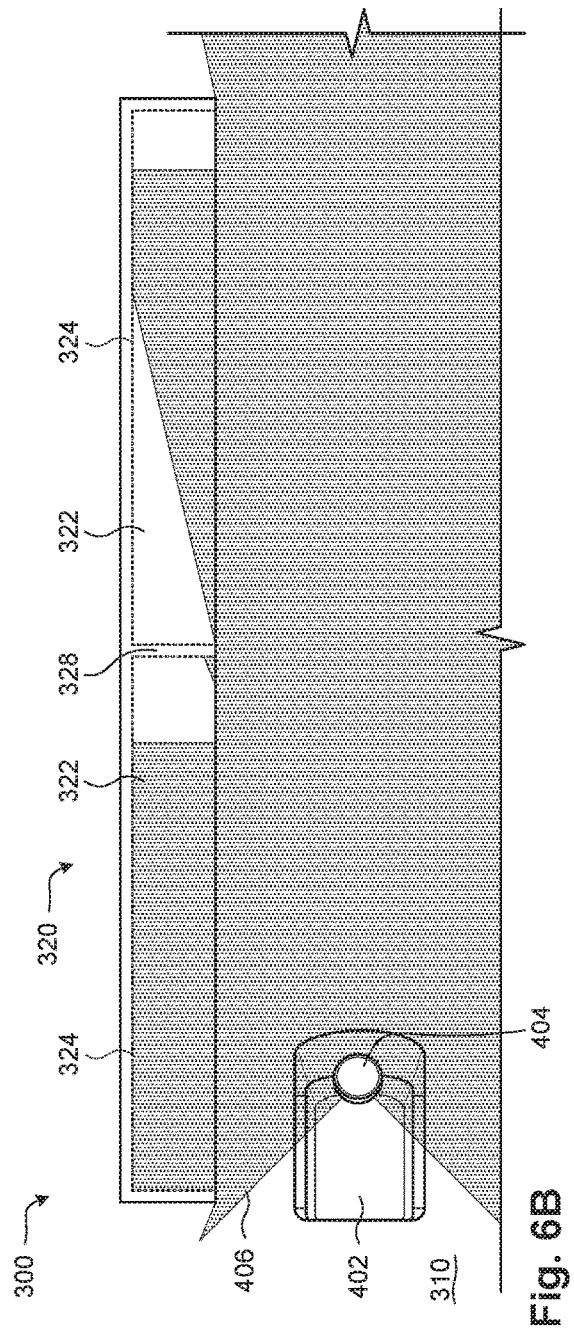

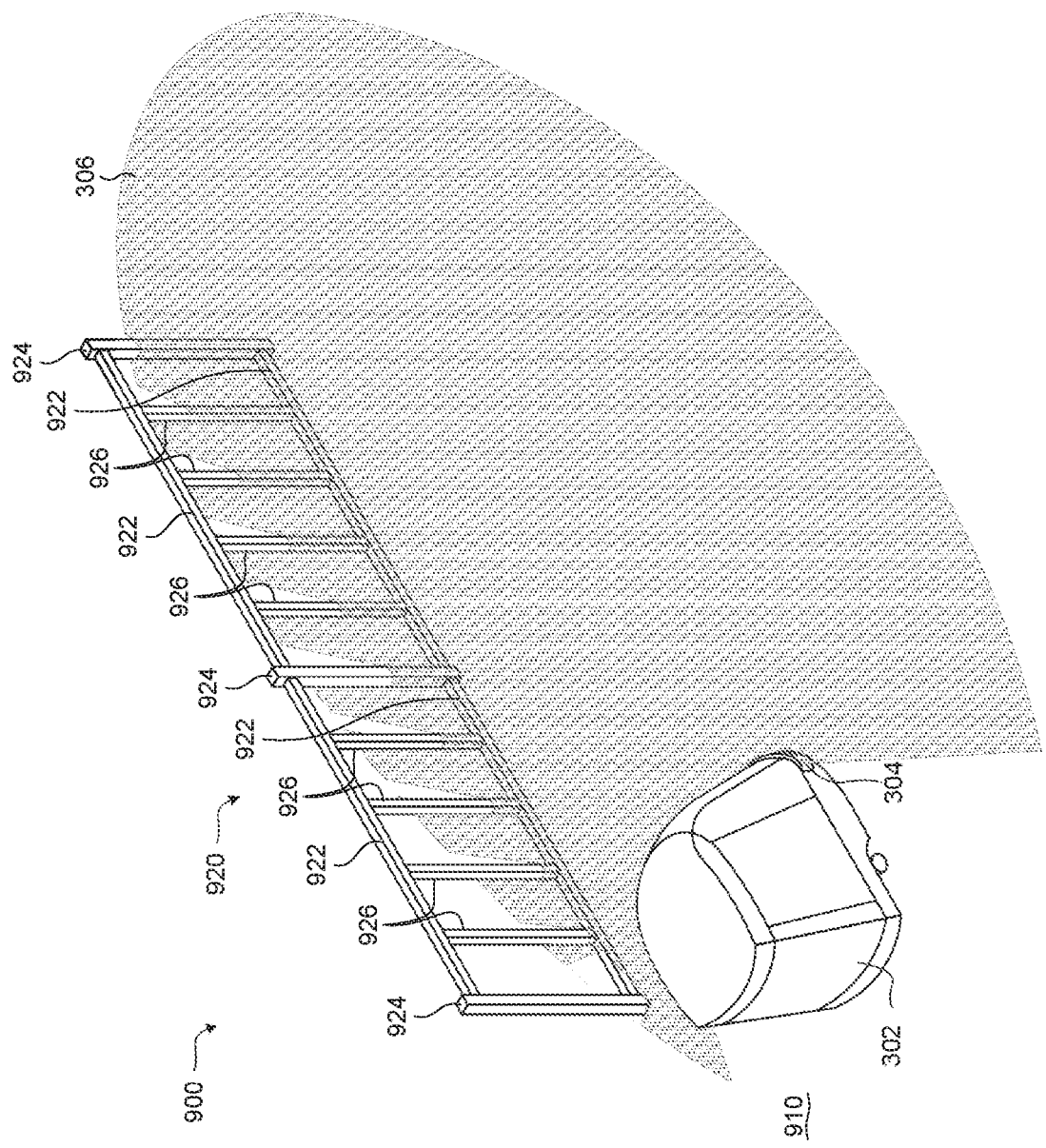

THREE-DIMENSIONAL SCANNING USING FIXED PLANAR DISTANCE SENSORS

BACKGROUND

The present disclosure is in the technical field of autonomous vehicle sensors. More particularly, the present disclosure is directed to the use of a fixed planar distance sensor to develop a three-dimensional scan of the environment in which the autonomous vehicle operates.

Autonomous vehicles have the ability to minimize the human effort involved in performing everyday tasks. For example, autonomous vehicles may be used as cleaning devices to help maintain and clean surfaces, such as hardwood floors, carpets, and the like. While autonomous vehicles are useful, it can be challenging for autonomous vehicles to operate in a variety of different locations. This challenge is especially the case when an autonomous vehicle operates in an environment with horizontally-extending protrusions, such as the shelves of shelf racks in retail stores.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system is capable of three-dimensional scanning in an environment containing a protrusion that extends substantially parallel to a floor. The system includes an autonomous vehicle, a planar distance sensor, and a computing device. The autonomous vehicle is configured to be located on the floor and to move across the floor. The planar distance sensor is fixedly mounted to the autonomous vehicle. A field of the planar distance sensor is at a non-parallel angle with respect to the floor when the autonomous vehicle is on the floor. The field of the planar distance sensor impinges on a surface of the protrusion when the autonomous vehicle is on the floor. The computing device is located on the autonomous vehicle and configured to develop a three-dimensional scan of the protrusion as the autonomous vehicle moves across the floor.

In one example, the planar distance sensor is mounted to the autonomous vehicle at a front end of the autonomous vehicle in a bottom half of the autonomous vehicle. In another example, the field of the planar distance sensor extends away from the floor frontward of the front end of the autonomous vehicle. In another example, the surface of the protrusion is a bottom surface of the protrusion and a portion of the field of the planar distance sensor extends away from the floor frontward of the front end of the autonomous vehicle until it impinges on the bottom surface of the protrusion. In another example, the field of the planar distance sensor extends downward to the floor behind the front end of the autonomous vehicle. In another example, the computing device is further configured to develop a three-dimensional scan of the floor as the autonomous vehicle moves across the floor.

In another example, the planar distance sensor is mounted to the autonomous vehicle above a top of the autonomous vehicle. In another example, the planar distance sensor is mounted to one of a front end of the top of the autonomous vehicle or a back end of the top of the autonomous vehicle. In another example, the field of the planar distance sensor extends toward the floor frontward of a location at which the planar distance sensor is mounted to the top of the autonomous vehicle. In another example, the field of the planar distance sensor is substantially perpendicular to the floor. In another example, the field of the planar distance sensor passes above a top of the autonomous vehicle and the field of the planar distance sensor is not parallel to a forward movement direction of the autonomous vehicle. In another example, the protrusion is a shelf in a rack of shelves. In another example, the computing device is further configured to develop a three-dimensional scan of a plurality of shelves in the rack of shelves as the autonomous vehicle moves across the floor.

In another embodiment, a planar scanning system is capable of being used with an autonomous vehicle. The autonomous vehicle is configured to move across a floor and the autonomous vehicle has front and back ends. The planar scanning system includes a first planar distance sensor, a second planar distance sensor, and a computing device. The first planar distance sensor is mounted on a first half of the autonomous vehicle. The field of the first planar distance sensor is at a first non-parallel angle with respect to the floor. The second planar distance sensor is mounted on a second half of the autonomous vehicle. A field of the second planar distance sensor is at a second non-parallel angle with respect to the floor. The computing device is communicatively coupled to the first and second planar distance sensors. The computing device is configured to develop a three-dimensional scan of a portion of an environment in which the autonomous vehicle moves based on readings of the first and second planar distance sensors. The first non-parallel angle and the second non-parallel angle are different from each other and the first and second planar distance sensors are arranged such that an intersecting line of the field of the first planar distance sensor and the field of the second planar distance sensor is forward of the front end of the autonomous vehicle.

In one example, the first planar distance sensor is mounted to a top half of the autonomous vehicle and the field of the first planar distance sensor extends toward the floor frontward of a location at which the first planar distance sensor is mounted to the top half of the autonomous vehicle. In another example, the second planar distance sensor is mounted to a bottom half of the autonomous vehicle and the field of the second planar distance sensor extends away from the floor frontward of a location at which the second planar distance sensor is mounted to the bottom half of the autonomous vehicle. In another example, the intersecting line of the field of the first planar distance sensor and the field of the second planar distance sensor is substantially parallel to the floor and substantially perpendicular to a forward direction of the autonomous vehicle.

In another example, the first planar distance sensor is mounted to a right half of the autonomous vehicle and the field of the first planar distance sensor extends downward to the floor to the right of a location at which the first planar distance sensor is mounted to the right half of the autonomous vehicle. In another example, the second planar distance sensor is mounted to a left half of the autonomous vehicle and the field of the second planar distance sensor extends downward to the floor to the left of a location at which the second planar distance sensor is mounted to the left half of the autonomous vehicle. In another example, the intersecting line of the field of the first planar distance sensor and the field of the second planar distance sensor is substantially perpendicular to a forward direction of the autonomous vehicle. In another example, the intersecting line is angled downward in a direction forward of the front end of the autonomous vehicle.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 3A to 3D depict instances of an environment and operation of an autonomous vehicle in the environment, in accordance with the embodiments described herein;

FIGS. 5A and 5B depict side and top views, respectively, of a first instance of the autonomous vehicle shown in FIG. 4 moving across the floor in the environment shown in FIG. 4, in accordance with the embodiments described herein;

FIGS. 5C and 5D depict side and top views, respectively, of a second instance of the autonomous vehicle shown in FIG. 4 moving across the floor in the environment shown in FIG. 4, in accordance with the embodiments described herein;

FIGS. 6A and 6B depict side and top views, respectively, of an embodiment of another autonomous vehicle located in the environment shown in FIG. 4, in accordance with the embodiments described herein;

FIG. 11 depicts the autonomous vehicle shown in FIG. 4 in one embodiment of an environment where the fixed planar distance sensor of the autonomous vehicle impinges on a horizontally-protruding railing, in accordance with the embodiments described herein.

DETAILED DESCRIPTION

The present disclosure describes embodiments of autonomous vehicles that include fixed planar distance sensors that are used to develop a three-dimensional scan of horizontally-extending protrusions in environments. A planar distance sensor is fixedly mounted on an autonomous vehicle at an angle that is not parallel to the floor on which the autonomous vehicle as the autonomous vehicle moves across the floor. As the autonomous vehicle moves across the floor, the data gathered by the planar distance sensor can be used by a computing device to generate a three-dimensional scan of a horizontally-extending protrusion in the environment.

Figure 1:
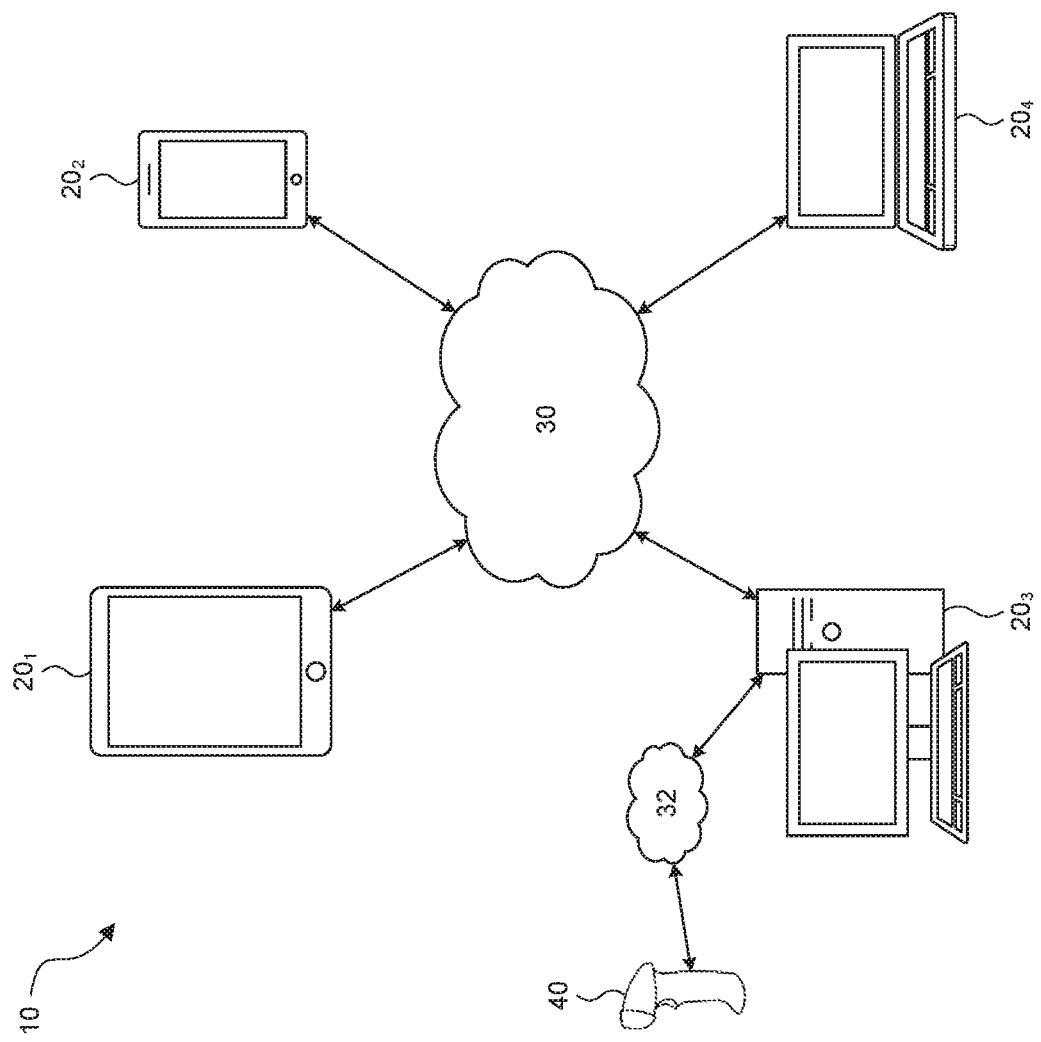
FIG. 1 depicts an example embodiment of a system that may be used to implement some or all of the embodiments described herein.

FIG. 1 depicts an example embodiment of a system 10 that may be used to implement some or all of the embodiments described herein. In the depicted embodiment, the system 10 includes computing devices $20_1$, $20_2$, $20_3$, and $20_4$ (collectively computing devices 20). In the depicted embodiment, the computing device $20_1$ is a tablet, the computing device $20_2$ is a mobile phone, the computing device $20_3$ is a desktop computer, and the computing device $20_4$ is a laptop computer. In other embodiments, the computing devices 20 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 20 are communicatively coupled to each other via one or more networks 30 and 32. Each of the networks 30 and 32 may include one or more wired or wireless networks (e.g., a 3G network, the Internet, an internal network, a proprietary network, a secured network). The computing devices 20 are capable of communicating with each other and/or any other computing devices via one or more wired or wireless networks. While the particular system 10 in FIG. 1 depicts that the computing devices 20 communicatively coupled via the network 30 include four computing devices, any number of computing devices may be communicatively coupled via the network 30.

In the depicted embodiment, the computing device $20_3$ is communicatively coupled with a peripheral device 40 via the network 32. In the depicted embodiment, the peripheral device 40 is a scanner, such as a barcode scanner, an optical scanner, a computer vision device, and the like. In some embodiments, the network 32 is a wired network (e.g., a direct wired connection between the peripheral device 40 and the computing device $20_3$), a wireless network (e.g., a Bluetooth connection or a WiFi connection), or a combination of wired and wireless networks (e.g., a Bluetooth connection between the peripheral device 40 and a cradle of the peripheral device 40 and a wired connection between the peripheral device 40 and the computing device $20_3$). In some embodiments, the peripheral device 40 is itself a computing device (sometimes called a "smart" device). In other embodiments, the peripheral device 40 is not a computing device (sometimes called a "dumb" device).

Figure 2:
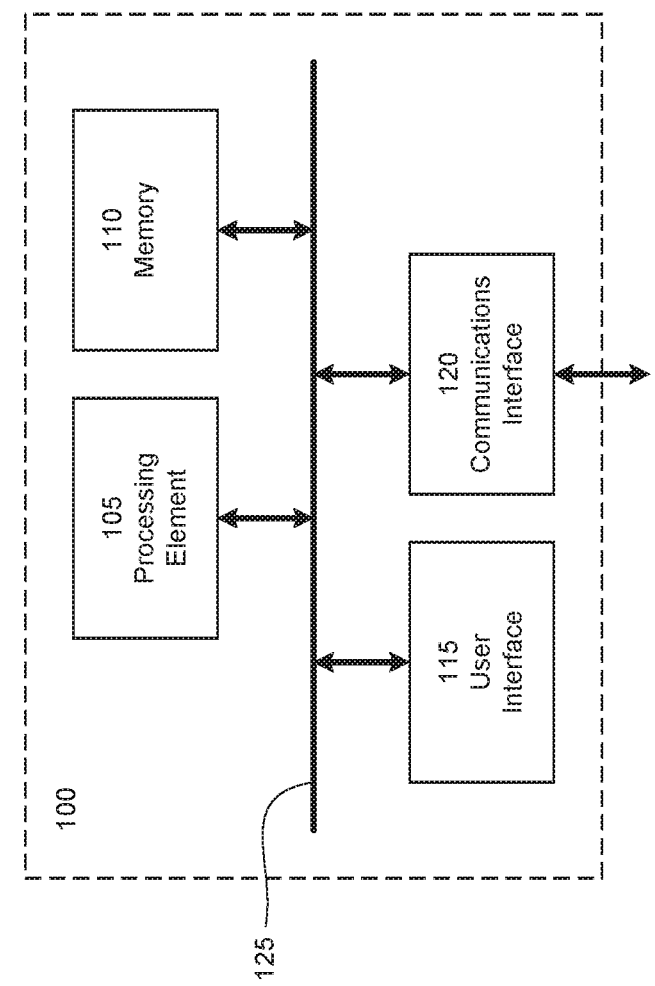
FIG. 2 depicts a block diagram of an embodiment of a computing device, in accordance with the embodiments described herein.

Depicted in FIG. 2 is a block diagram of an embodiment of a computing device 100. Any of the computing devices 20 and/or any other computing device described herein may include some or all of the components and features of the computing device 100. In some embodiments, the computing device 100 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 100 includes a processing element 105, memory 110, a user interface 115, and a communications interface 120. The processing element 105, memory 110, a user interface 115, and a communications interface 120 are capable of communicating via a communication bus 125 by reading data from and/or writing data to the communication bus 125. The computing device 100 may include other components that are capable of communicating via the communication bus 125. In other embodiments, the computing device does not include the communication bus 125 and the components of the computing device 100 are capable of communicating with each other in some other way.

The processing element 105 (also referred to as one or more processors, processing circuitry, and/or similar terms used herein) is capable of performing operations on some external data source. For example, the processing element may perform operations on data in the memory 110, data receives via the user interface 115, and/or data received via the communications interface 120. As will be understood, the processing element 105 may be embodied in a number of different ways. In some embodiments, the processing element 105 includes one or more complex programmable logic devices (CPLDs), microprocessors, multi-core processors, co-processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 105 is configured for a particular use or configured to execute instructions stored in volatile or nonvolatile media or otherwise accessible to the processing element 105. As such, whether configured by hardware or computer program products, or by a combination thereof, the processing element 105 may be capable of performing steps or operations when configured accordingly.

The memory 110 in the computing device 100 is configured to store data, computer-executable instructions, and/or any other information. In some embodiments, the memory 110 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD-ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 110 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity-relationship model, object model, document model, semantic model, graph model, or any other model.

The user interface 115 of the computing device 100 is in communication with one or more input or output devices that are capable of receiving inputs into and/or outputting any outputs from the computing device 100. Embodiments of input devices include a keyboard, a mouse, a touchscreen display, a touch sensitive pad, a motion input device, movement input device, an audio input, a pointing device input, a joystick input, a keypad input, peripheral device 40, foot switch, and the like. Embodiments of output devices include an audio output device, a video output, a display device, a motion output device, a movement output device, a printing device, and the like. In some embodiments, the user interface 115 includes hardware that is configured to communicate with one or more input devices and/or output devices via wired and/or wireless connections.

The communications interface 120 is capable of communicating with various computing devices and/or networks. In some embodiments, the communications interface 120 is capable of communicating data, content, and/or any other information, that can be transmitted, received, operated on, processed, displayed, stored, and the like. Communication via the communications interface 120 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 120 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 100 may be located remotely from other components of the computing device 100 components, such as in a distributed system. Furthermore, one or more of the components may be combined and additional components performing functions described herein may be included in the computing device 100. Thus, the computing device 100 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer-readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer-readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Depicted in FIGS. 3A to 3D are various instances of an environment 200 and operation of an autonomous vehicle 202 in the environment 200. In some examples, the autonomous vehicle 202 may be one of a SWINGBOT, an AEROBOT, or a DUOBOT, all of which are produced by TASKI INTELLIBOT of Richmond, VA The autonomous vehicle 202 includes a planar distance sensor 204 that senses distances from the planar distance sensor 204 in at least a portion of a plane. In some embodiments, such as in the embodiments depicted in FIGS. 3A to 3D, the planar distance sensor 204 emits electromagnetic energy in a field 206 within the plane of the planar distance sensor 204. In some embodiments, the planar distance sensor 204 is a lidar sensor that emits electromagnetic energy from a laser. In some examples, the planar distance sensor 204 emits electromagnetic energy in one or more of an ultraviolet range (i.e., electromagnetic energy having a wavelength between about 10 nm and about 400 nm), a visible light range (i.e., electromagnetic energy having a wavelength between about 400 nm and about 700 nm), or an infrared range (i.e., electromagnetic energy having a wavelength between about 700 nm and about 1 mm). In some embodiments, the planar distance sensor 204 is any other type of distance sensor that senses distance within a plane, such as a planar sonar sensor.

In the depicted embodiment, the autonomous vehicle 202 is located on a floor 210 and the autonomous vehicle 202 is configured to move across the floor 210. In some embodiments, the autonomous vehicle 202 includes a computing device (not shown) that is configured to control the movements of the autonomous vehicle 202 across the floor 210.

In the embodiments shown in FIGS. 3A to 3D, the field 206 of the planar distance sensor 204 is substantially parallel to the floor 210. The planar distance sensor 204 generates signals based on the distance of objects away from the planar distance sensor 204 and sends the generated signals to the autonomous vehicle 202 (e.g., to a computing device in the autonomous vehicle 202). This arrangement of the planar distance sensor 204 allows the autonomous vehicle 202 to detect objects or obstacles located around the autonomous vehicle 202.

In the instances shown in FIGS. 3A to 3C, the autonomous vehicle 202 is in an area of the environment 200 near a rack 220 of shelves $222_1$, $222_2$, and $222_3$ (collectively shelves 222). The shelves 222 protrude substantially horizontally from a back 224 of the rack 220. The rack 220 also includes a kick plate 226 located at the floor 210 beneath the shelf $222_1$. In the instance shown in FIG. 3D, the autonomous vehicle 202 is in an area of the environment 200 near a rack 230 of shelves $232_1$, $232_2$, and $232_3$ (collectively shelves 232). The shelves 232 protrude substantially horizontally from a back 234 of the rack 230. The rack 230 also includes a kick plate 236 located at the floor 210 beneath the shelf $232_1$. The rack 220 of shelves 222 and the rack 230 of shelves 232 have different sizes and arraignments. In one example, the shelves 222 are at a different height than the shelves 232. In another example, the kick plate 226 is taller than the kick plate 236 and the kick plate 226 extends further away from the back 224 than the kick plate 236 extends from the back 234.

The instances shown in FIGS. 3A to 3D depict a number of difficulties when the field of a planar distance sensor is substantially parallel to the floor in an environment with a protrusion that extends substantially parallel to a floor (e.g., a shelf). In FIG. 3A, the planar distance sensor 204 is positioned vertically on the autonomous vehicle 202 at a point where the field 206 impinges the rack 220 on the kick plate 226. Based on the signals generated by the planar distance sensor 204, the autonomous vehicle 202 will determine that the closest object to the autonomous vehicle 202 is the kick plate 226, but the autonomous vehicle 202 will not identify that the horizontally-protruding shelves 222 extend out further than the kick plate 226. In FIG. 3B, the planar distance sensor 204 is positioned vertically on the autonomous vehicle 202 at a point where the field 206 impinges the rack 220 on the back 224. Based on the signals generated by the planar distance sensor 204, the autonomous vehicle 202 will determine that the closest object to the autonomous vehicle 202 is the back 224, but the autonomous vehicle 202 will not identify that the horizontally-protruding shelves 222 extend out further than the back 224. In both instances depicted in FIGS. 3A and 3B, the autonomous vehicle 202 could collide with one of the horizontally-protruding shelves 222 because it cannot detect the end of the shelf $222_1$ that is closest to the autonomous vehicle 202.

In FIG. 3C, the planar distance sensor 204 is positioned vertically on the autonomous vehicle 202 at a point that is almost intended to be aligned with the shelf $222_1$. This arrangement may allow the autonomous vehicle 202 to detect the end of the shelf $222_1$ that is closest to the autonomous vehicle 202. However, as depicted in FIG. 3C, the field 206 may not be properly aligned with the shelf $222_1$ even if the planar distance sensor 204 was intended to be positioned to be properly aligned with the shelf $222_1$. More specifically, in FIG. 3C, a portion of the field 206 impinges on the shelf $222_1$ and the other portion of the field 206 impinges on the kick plate 226. This may cause the planar distance sensor 204 to produce inconsistent signals about the distance from the autonomous vehicle 202 to the rack 220. Moreover, as depicted in FIG. 3D, even if the planar distance sensor 204 is positioned to be aligned with the shelf $222_1$, such positioning of the planar distance sensor 204 may not be proper for other racks of shelves. For example, the planar distance sensor 204 is positioned on the autonomous vehicle 202 at the same location in both FIGS. 3C and 3D, but the field 206 does not impinge on the shelf $232_3$ in FIG. 3D. Instead, the field 206 impinges on the back 234 of the rack 230 in FIG. 3D. Thus, while the planar distance sensor 204 may be arranged appropriately to scan one particular horizontally-protruding object (e.g., shelf $222_3$ of rack 220), that arrangement of the planar distance sensor 204 may not work to scan other horizontally-protruding objects (e.g., shelf $232_3$ of rack 230).

Described herein are arrangements of fixed planar distance sensors located on autonomous vehicles in a way that addresses the aforementioned problems of being able to scan protrusions that extend substantially parallel to the floor on which the autonomous vehicles move. More specifically, described herein are embodiments of autonomous vehicles with fixed planar distance sensors oriented at angles that are not parallel to the floor on which the autonomous vehicles move. The arrangement of a planar distance sensor not parallel to the floor allows a computing device to develop a three-dimensional scan of a protrusion that extends substantially parallel to the floor as the autonomous vehicle moves across the floor.

Figure 4:
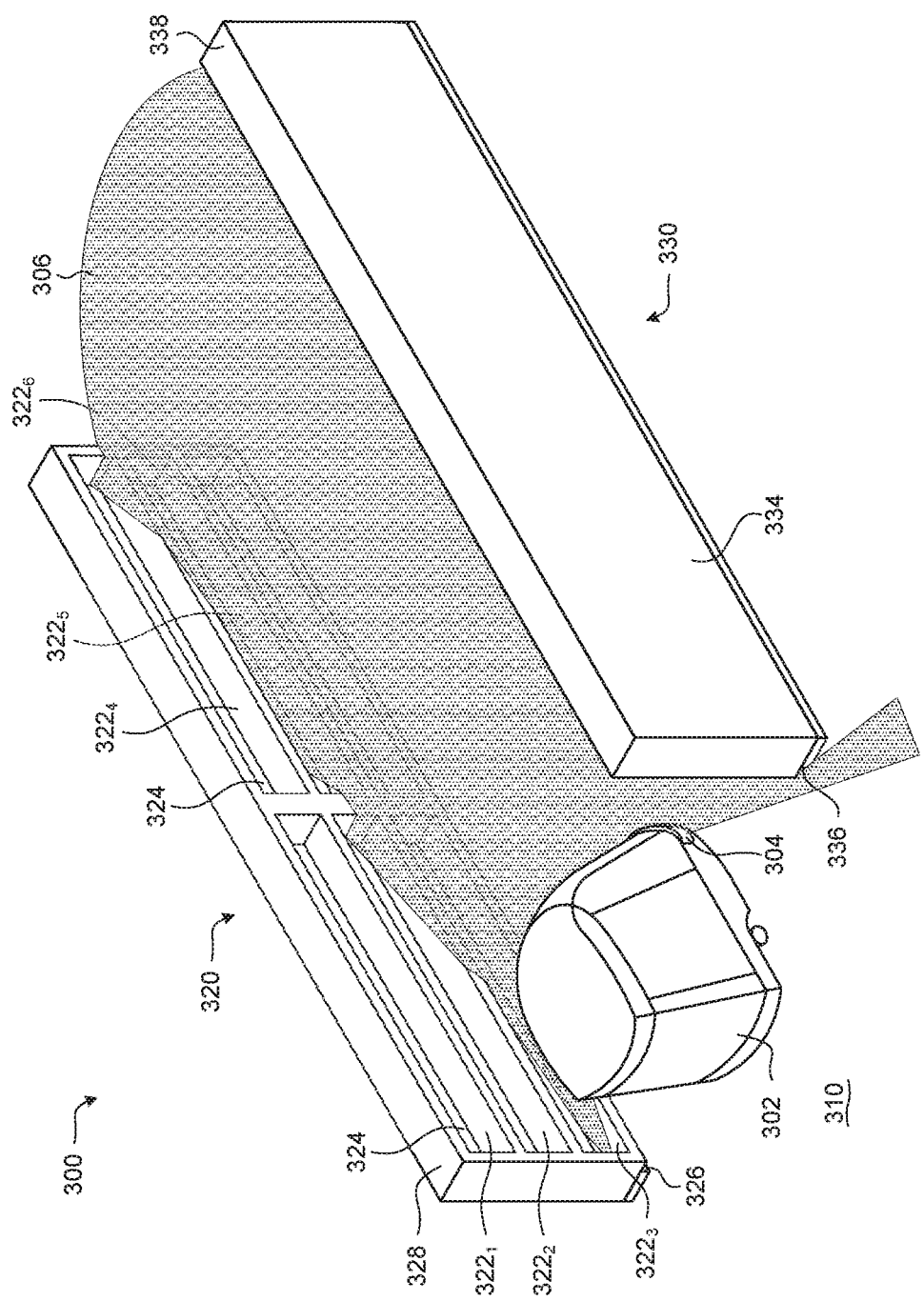
FIG. 4 depicts an environment that includes an autonomous vehicle that is capable of scanning horizontally extending shelves in a rack of shelves using a fixed planar distance sensor, in accordance with the embodiments described herein.

In the embodiment depicted in FIG. 4, an environment 300 includes an autonomous vehicle 302, a rack 320 of shelves $322_1$, $322_2$, $322_3$, $322_4$, $322_5$, and $322_6$ (collectively shelves 322), and another rack 330 of shelves (not visible in FIG. 4). The autonomous vehicle 302 includes a planar distance sensor 304 that senses distances from the planar distance sensor 304 in at least a portion of a plane. In some embodiments, such as in the embodiments depicted in FIG. 4, the planar distance sensor 304 emits electromagnetic energy in a field 306 within the plane of the planar distance sensor 304. In some embodiments, the planar distance sensor 304 is a lidar sensor that emits electromagnetic energy from a laser.

The autonomous vehicle 302 is located on a floor 310 and the autonomous vehicle 302 is configured to move across the floor 310. In some embodiments, the autonomous vehicle 302 includes a computing device (not shown) that is configured to control the movements of the autonomous vehicle 302 across the floor 310. The planar distance sensor 304 generates signals based on the distance of objects away from the planar distance sensor 304 and sends the generated signals to the autonomous vehicle 302 (e.g., to a computing device in the autonomous vehicle 302). In the embodiments shown in FIG. 4, the field 306 of the planar distance sensor 304 is not parallel to the floor 310. More specifically, the planar distance sensor 304 is mounted to the autonomous vehicle 302 at a front end of the autonomous vehicle 302 in a bottom half of the autonomous vehicle 302. In the depicted embodiment, the field 306 of the planar distance sensor 304 extends away from the floor 310 frontward of the front end of the autonomous vehicle 302.

In the rack 320 of shelves 322, the shelves 322 protrude substantially horizontally from a back 324 of the rack 320. The rack 320 also includes a kick plate 326 located at the floor 310 beneath the shelf $322_1$. The rack 320 includes a frame 328 that forms vertical walls and a top around the shelves 322. The rack 330 of shelves also includes shelves (not visible) that protrude substantially horizontally from a back 334 of the rack 320. The rack 330 also includes a kick plate 336 located at the floor 310 beneath the shelves of the rack 330. The rack 330 also includes a frame 338 that forms vertical walls and a top around the shelves of the rack 330.

As can be seen in FIG. 4, the orientation of the planar distance sensor 304 on the autonomous vehicle 304 at a non-parallel angle with respect to the floor 310 causes the field 306 to impinge on both the bottom surfaces and the ends of the shelves $322_1$ and $322_2$. Similarly, although not visible in FIG. 4, the field 306 impinges on the bottom surfaces and the ends of the shelves in the rack 330. Additionally, portions of the field 306 extend downward in a rearward direction from the front of the autonomous vehicle 302. This allows the field 306 to extend toward the floor 310 rearward of the front of the autonomous vehicle 302. In the particular embodiment shown in FIG. 4, portions of the field 306 extend down to the upper surface of the shelf $322_3$, to the kick plate 336 and to the floor 310 to the side of the rack 330. This arrangement of the planar distance sensor 304 allows the autonomous vehicle 302 to detect a number of features of the environment 300, such as horizontally-protruding objects (e.g., shelves 322), the location of the floor, the location of kick plates (e.g., kick plate 336), and other features.

Another benefit to the use of a fixed planar distance sensor on an autonomous vehicle at a non-parallel angle with respect to the floor is that a three-dimensional scan of the environment can be developed as the autonomous vehicle moves across the floor. An example of this function is depicted in a series of instances of the autonomous vehicle 302 shown in FIGS. 5A to 5F. More specifically, FIGS. 5A and 5B depict side and top views, respectively, of a first instance of the autonomous vehicle 302 moving across the floor 310, FIGS. 5C and 5D depict side and top views, respectively, of a second instance of the autonomous vehicle 302 moving across the floor 310, and FIGS. 5E and 5F depict side and top views, respectively, of a third instance of the autonomous vehicle 302 moving across the floor 310.

In FIGS. 5A and 5B, the autonomous vehicle 302 is in a position where the field 306 impinges on the bottom surface of the shelf $322_2$, the top surface of the shelf $322_3$, the bottom surface of the shelf $322_4$, a portion of the frame 328 between the shelves $322_2$ and $322_5$, a portion of the frame 328 above the shelf $322_4$, and portions of the floor 310. The planar distance sensor 304 generates signals indicative of data based on the impingement of the field 306 on objects in the environment 300 and feeds the signals to a computing device. The computing device is able to develop a three-dimensional scan of the objects in the environment, including horizontally-extending protrusions (e.g., shelves 322).

The autonomous vehicle 304 is able to move across the floor 310. From the location depicted in FIGS. 5A and 5B, the autonomous vehicle 304 moves forward (i.e., to the right in the views shown in FIGS. 5A and 5B) until the autonomous vehicle 304 reaches the located depicted in FIGS. 5C and 5D. In the instance depicted in FIGS. 5C and 5D, the field 306 impinges on the bottom surface of the shelf $322_2$, the top surface of the shelf $322_3$, the bottom surface of the shelf $322_4$, a portion of the frame 328 between the shelves $322_2$ and $322_5$, a portion of the frame 328 to the right of the shelf $322_4$, and portions of the floor 310. The points at which the field 306 impinges on the bottom surface of the shelf $322_2$, the top surface of the shelf $322_3$, the bottom surface of the shelf $322_4$ are further to the right in the second instance shown in FIGS. 5C and 5D than in first instance shown in FIGS. 5A and 5B. As the autonomous vehicle 302 moved from the first instance to the second instance, the field 306 moved along those objects and the computing device continued to develop a three-dimensional scan of the objects. Such data can be saved to develop a point space representing a three-dimensional map of the environment 300. Thus, as the autonomous vehicle 302 moves, the orientation of the planar distance sensor 304 at a non-parallel angle with respect to the floor allows a three-dimensional map of the environment 300 to be developed even though the planar distance sensor 304 does not move with respect to the autonomous vehicle 302.

Figure 5E:
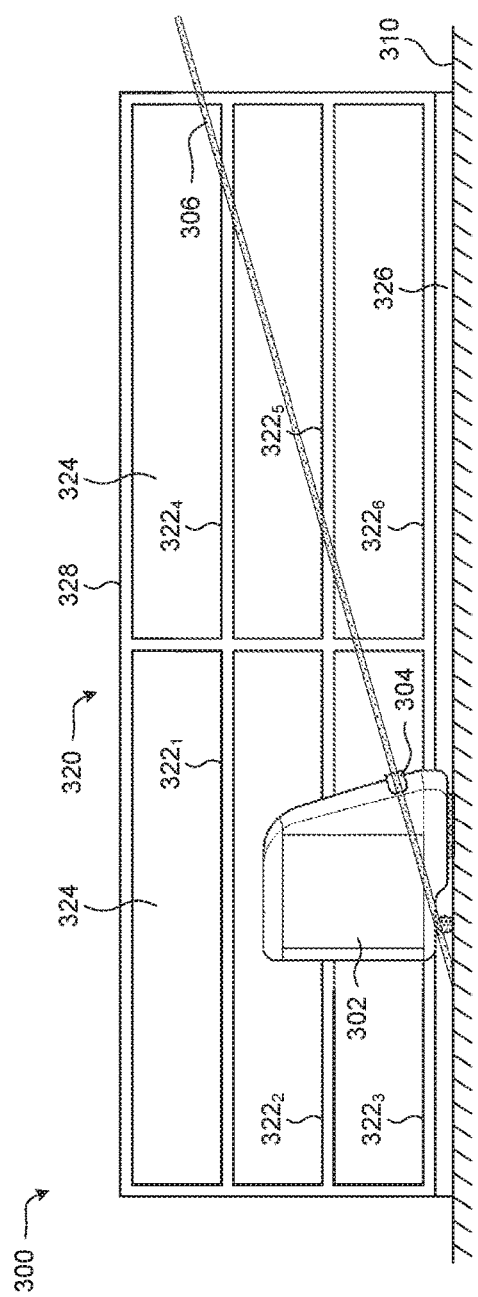
FIGS. 5E and 5F depict side and top views, respectively, of a third instance of the autonomous vehicle shown in FIG. 4 moving across the floor in the environment shown in FIG. 4, in accordance with the embodiments described herein.
Figure 5F:
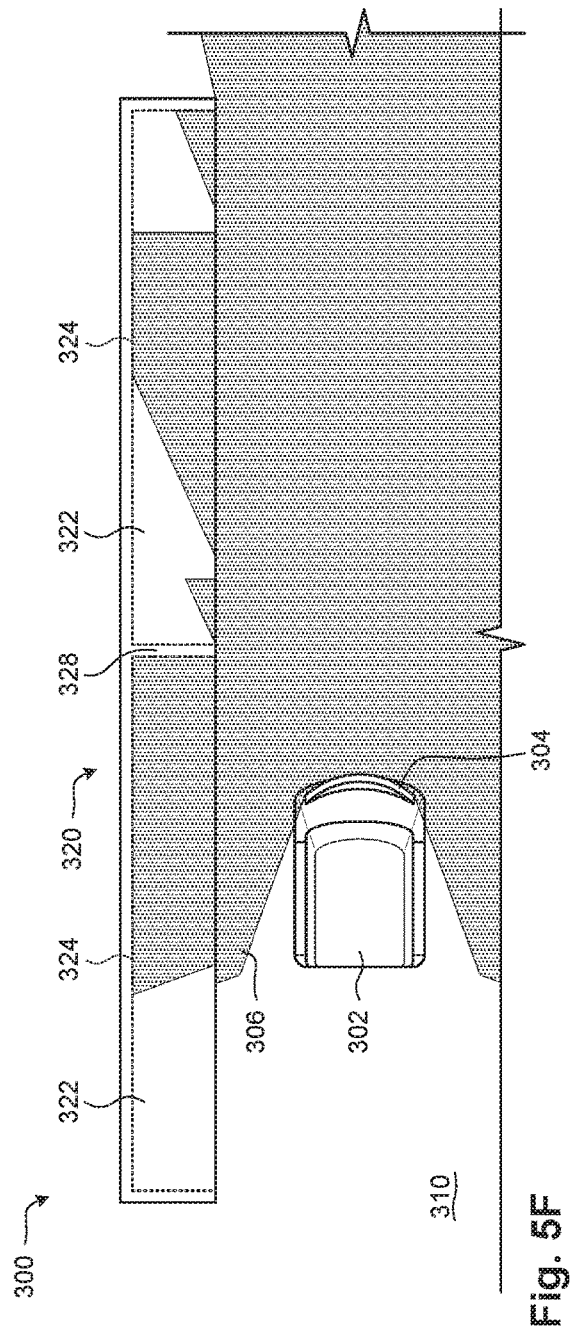

From the location depicted in FIGS. 5C and 5D, the autonomous vehicle 304 moves forward (i.e., to the right in the views shown in FIGS. 5C and 5D) until the autonomous vehicle 304 reaches the located depicted in FIGS. 5E and 5F. In the instance depicted in FIGS. 5E and 5F, the field 306 impinges on the top surface of the shelf $322_3$, the bottom surface of the shelf $322_4$, the bottom surface of the shelf $322_5$, a portion of the frame 328 between the shelves $322_3$ and $322_6$, a portion of the frame 328 to the right of the shelf $322_4$, and portions of the floor 310. As the autonomous vehicle 302 moves from the second instance shown in FIGS. 5C and 5D to the third instance shown in FIGS. 5E and 5F, the field 306 moves along those objects and the computing device continues to develop a three-dimensional scan of the objects. Thus, as the autonomous vehicle 302 moves, a three-dimensional map of the environment 300 may continue to be developed. This process may continue indefinitely, further refining the three-dimensional map and making changes to the three-dimensional map as changes occur in the environment 300.

The autonomous vehicle 302 is one embodiment with a planar distance sensor 304 fixedly mounted thereto at a non-parallel angle with respect to the floor 310 on which the autonomous vehicle 302 moves. In that embodiment, the planar distance sensor 304 is mounted to the autonomous vehicle 302 at a front end of the autonomous vehicle 304 in a bottom half of the autonomous vehicle 304. The field 306 of the planar distance sensor 304 extends away from the floor 310 frontward of the front end of the autonomous vehicle 302. The planar distance sensor 304 is capable of developing a three-dimensional scan of a protrusion that extends substantially parallel to the floor 310, such one or more of the shelves 322. In some cases, the surface of the protrusion is a bottom surface of the protrusion (e.g., a bottom surface of one of the shelves 322) and the field 306 of the planar distance sensor extends away from the floor 310 frontward of the front end of the autonomous vehicle 302 until it impinges on the bottom surface of the protrusion (e.g., the one of the shelves 322). The field 306 of the planar distance sensor 304 also extends downward to the floor 310 behind the front end of the autonomous vehicle 302. Using the data generated by the planar distance sensor 304, a three-dimensional scan of the floor 310 can be developed as the autonomous vehicle 302 moves across the floor 310. While the autonomous vehicle 302 is one embodiment, the subject matter described herein is not limited to that embodiment and other embodiments are described below.

Depicted in FIGS. 6A and 6B are side and top views, respectively, of an autonomous vehicle 402 located in the environment 300. The autonomous vehicle 402 includes a planar distance sensor 404 that senses distances from the planar distance sensor 404 to objects in a field 406. The planar distance sensor 404 is at a non-parallel angle with respect to the floor 310 when the autonomous vehicle 402 moves across the floor. In this particular embodiment, the planar distance sensor 404 is mounted to the autonomous vehicle 402 above a top of the autonomous vehicle 402. The field 406 of the planar distance sensor 404 extends toward the floor 310 frontward of a location at which the planar distance sensor 404 is mounted to the top of the autonomous vehicle 402. While the planar distance sensor 404 is mounted to a front end of the autonomous vehicle 402 in FIGS. 6A and 6B, the planar distance sensor 404 could also be mounted to a back end of the autonomous vehicle 402 in a way that permits the field 406 to extend toward the floor 310 frontward of the autonomous vehicle 402.

In the instance depicted in FIGS. 6A and 6B, the field 406 impinges on the top surface of the shelf $322_2$, the top surface of the shelf $322_6$, a portion of the frame 328 between the shelves $322_3$ and $322_6$, a portion of the frame 328 to the left of the shelf $322_2$, and portions of the floor 310. In this position, the planar distance sensor 404 permits the autonomous vehicle 402 to develop a three-dimensional scan of the horizontally-protruding shelves $322_2$ and $322_6$, other portions of the rack 320, and the floor 310. If the autonomous vehicle 402 were to move across the floor 310, the autonomous vehicle 402 could develop a three-dimensional map of the environment 300, similar to what was described with respect to the autonomous vehicle 302 with respect to FIGS. 5A to 5F. Even though the field 406 does not impinge on the shelves $322_1$ and $322_4$ in the instance depicted in FIGS. 6A and 6B, the portion of the field that extends away from the floor 310 rearward of the planar distance sensor 404 would impinge on the shelves $322_1$ and $322_4$ as the autonomous vehicle 402 moved to the right.

One advantage of the autonomous vehicle 402 is the ability of the planar distance sensor 404 to detect objects that are located on the floor 310 in front of the autonomous vehicle 402. Because the field 406 extends toward the floor 310 frontward of the autonomous vehicle 402, any object located in front of the point at which the field 406 impinges on the floor would be detected as the autonomous vehicle moves forward. The autonomous vehicle 302 may detect these objects as well, but may not detect objects that are shorter than the location at which the planar distance sensor 304 is mounted to the autonomous vehicle 302. In contrast, the field 406 would impinge on any object in front of the autonomous vehicle 402 regardless of the object's height.

Figure 7A:
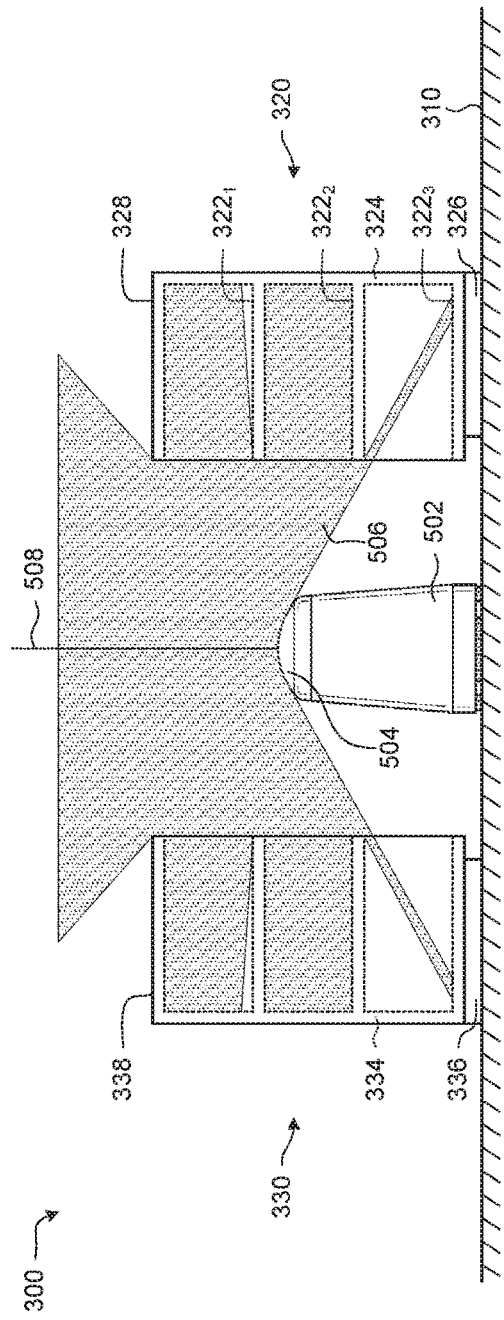
FIGS. 7A and 7B depict front and top views, respectively, of an embodiment of another autonomous vehicle located in the environment shown in FIG. 4, in accordance with the embodiments described herein.
Figure 7B:
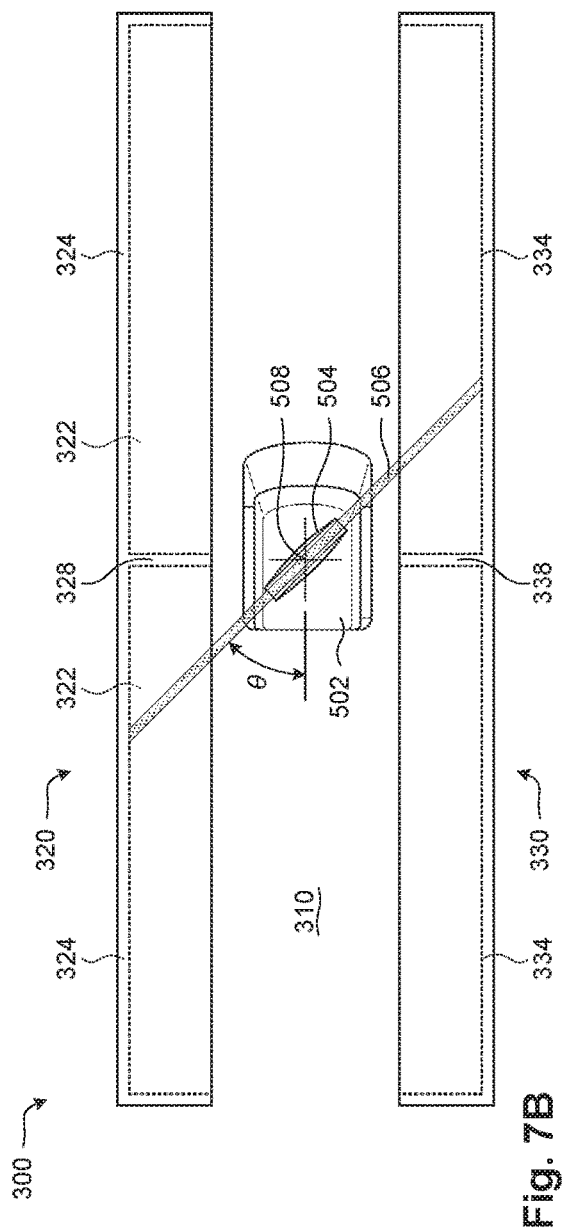

Depicted in FIGS. 7A and 7B are front and top views, respectively, of an autonomous vehicle 502 located in the environment 300. The autonomous vehicle 502 includes a planar distance sensor 504 that senses distances from the planar distance sensor 504 to objects in a field 506. The planar distance sensor 504 is at a non-parallel angle with respect to the floor 310 when the autonomous vehicle 502 moves across the floor 310. In this particular embodiment, the planar distance sensor 504 is substantially perpendicular to the floor 310. The field 506 of the planar distance sensor 504 extends upward above the planar distance sensor 504 and the field 506 extends downward toward the floor 310 on the sides of the autonomous vehicle 502.

In the depicted embodiment, the field 506 passes above the top of the autonomous vehicle 502 and the field 506 is not parallel to the forward movement direction of the autonomous vehicle 502. More specifically, the field 506 passes through a vertical axis 508 above the top of the autonomous vehicle 502 and the field 506 is at an angle θ with respect to the forward movement direction of the autonomous vehicle 502. In some examples, the angle θ is in a range from about 5° to about 90°. In one example, the angle θ is about 45°.

In the instance depicted in FIGS. 7A and 7B, the field 406 impinges on portions of the rack 320 on the bottom surface of the shelf $322_1$, the top surface of the shelf $322_2$, the top surface of the shelf $322_3$, portions of the back 324, and a portion of the frame 328 above shelf $322_1$. Similar portions of the rack 330 are also impinged by the field 506. In this position, the planar distance sensor 504 permits the autonomous vehicle 502 to develop a three-dimensional scan of the horizontally-protruding shelves 322 from the rack 320 and horizontal portions of the rack 330. While not depicted in FIGS. 7A and 7B, the autonomous vehicle could be located so that the field 506 impinges on one or more of the floor 310, the kick plate 326, and the kick plate 336. If the autonomous vehicle 502 were to move across the floor 310, the autonomous vehicle 502 could develop a three-dimensional map of the environment 300, similar to what was described with respect to the autonomous vehicle 302 with respect to FIGS. 5A to 5F.

Each of the autonomous vehicles 202, 302, 402, and 502 described above includes a single fixed planar distance sensor that is not parallel to the floor. The single fixed planar distance sensor can be used as the autonomous vehicle moves across the floor to develop a three-dimensional scan and/or map of the environment. While this may be accomplished with one fixed planar distance sensor, there may be additional benefits to using two or more fixed planar distance sensors on a single autonomous vehicle, where each of the two or more fixed planar distance sensors is at a different non-parallel angle with respect to the floor. In some embodiments, autonomous vehicles include two planar distance sensors that are mounted on different halves of the autonomous vehicle (e.g., on a top half and a bottom half, on a left half and a right half, on a front end and a back end, etc.).

Figure 8A:
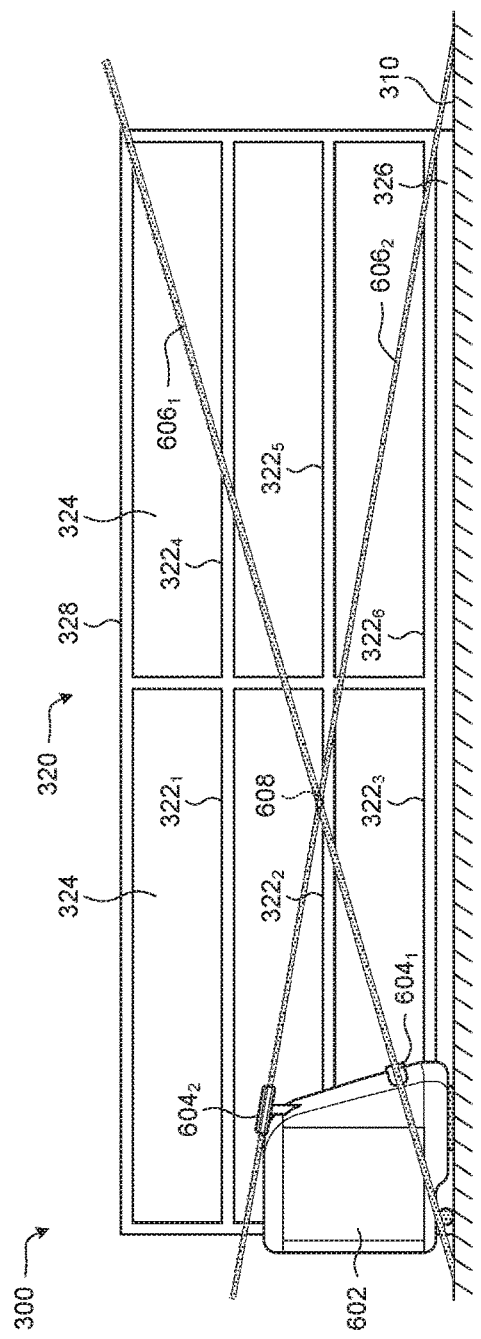
FIGS. 8A and 8B depict side and top views, respectively, of an embodiment of another autonomous vehicle located in the environment shown in FIG. 4, in accordance with the embodiments described herein.
Figure 8B:
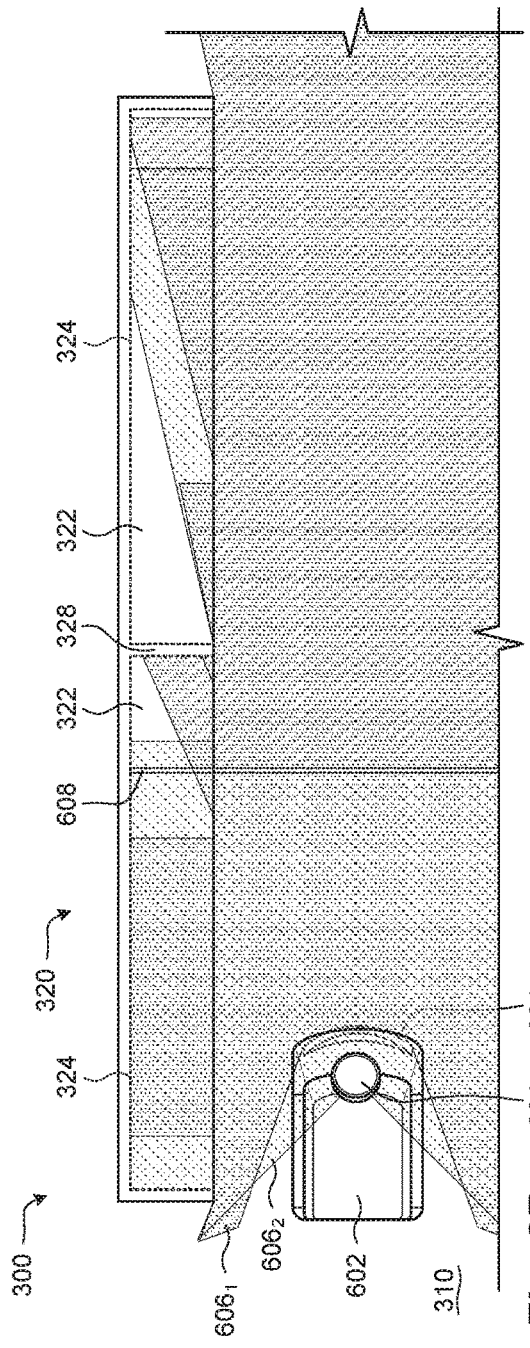

Depicted in FIGS. 8A and 8B are side and top views, respectively, of an autonomous vehicle 602 located in the environment 300. The autonomous vehicle 602 includes a planar distance sensor $604_1$ mounted on the bottom half of the autonomous vehicle 602 and a planar distance sensor $604_2$ mounted on the top half of the autonomous vehicle 602. The planar distance sensor $604_1$ is at a non-parallel angle with respect to the floor 310; a field $606_1$ of the planar distance sensor $604_1$ extends away from the floor 310 frontward of the location at which the planar distance sensor $604_1$ is mounted to the autonomous vehicle 602. The planar distance sensor $604_2$ is at a non-parallel angle with respect to the floor 310; a field $606_2$ of the planar distance sensor $604_2$ extends toward the floor 310 frontward of the location at which the planar distance sensor $604_2$ is mounted to the autonomous vehicle 602. As shown in the depicted embodiment, the non-parallel angle of the planar distance sensor $604_1$ is different than the non-parallel angle of the planar distance sensor $604_2$.

The two planar distance sensors $604_1$ and $604_2$ are arranged such that an intersecting line 608 of the planar distance sensors $604_1$ and $604_2$ is forward of a front end of the autonomous vehicle 602. In the depicted embodiment, the intersecting line 608 is substantially perpendicular to a forward direction of the autonomous vehicle 602. The intersecting line 608 is also substantially parallel to the floor 310. In this arrangement, the autonomous vehicle 602 gains the benefit of the upward-angled planar distance sensor $604_1$ being able to detect objects above the ground and the benefit of the downward-angled planar distance sensor $604_2$ being able to detect any object on the ground frontward of the autonomous vehicle 602. In this way, the fields $606_1$ and $606_2$ of the two planar distance sensors $604_1$ and $604_2$ form a curtain that does not permit any object in front of the autonomous vehicle 602 to go undetected.

Another benefit to the embodiment of the autonomous vehicle 602 is the increased speed at which three-dimensional scans and/or maps of the environment 300 may be developed. Because the autonomous vehicle 602 includes two planar distance sensors $604_1$ and $604_2$, approximately twice as much data is generated by the planar distance sensors $604_1$ and $604_2$ than would be generated by a single planar distance sensor. The signals generated by the two planar distance sensors $604_1$ and $604_2$ are sent to a computing device communicatively coupled to the autonomous vehicle 602, and the computing device is configured to develop a three-dimensional scan of a portion of the environment 300 in which the autonomous vehicle 602 moves based on readings of the planar distance sensors $604_1$ and $604_2$.

Figure 9A:
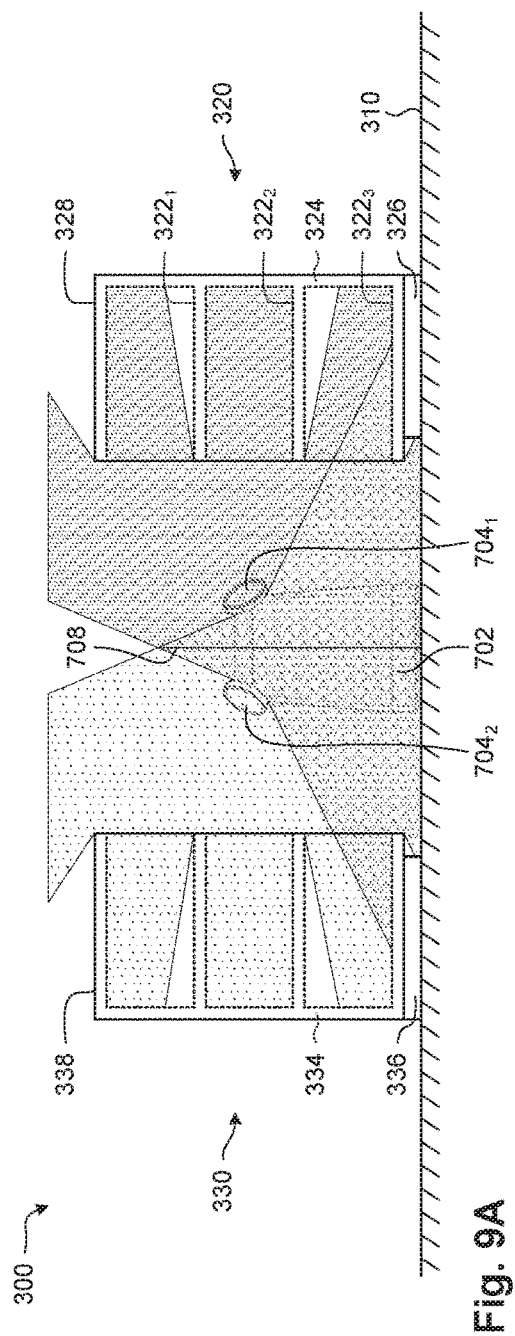
FIGS. 9A and 9B depict front and top views, respectively, of an embodiment of another autonomous vehicle located in the environment shown in FIG. 4, in accordance with the embodiments described herein.
Figure 9B:
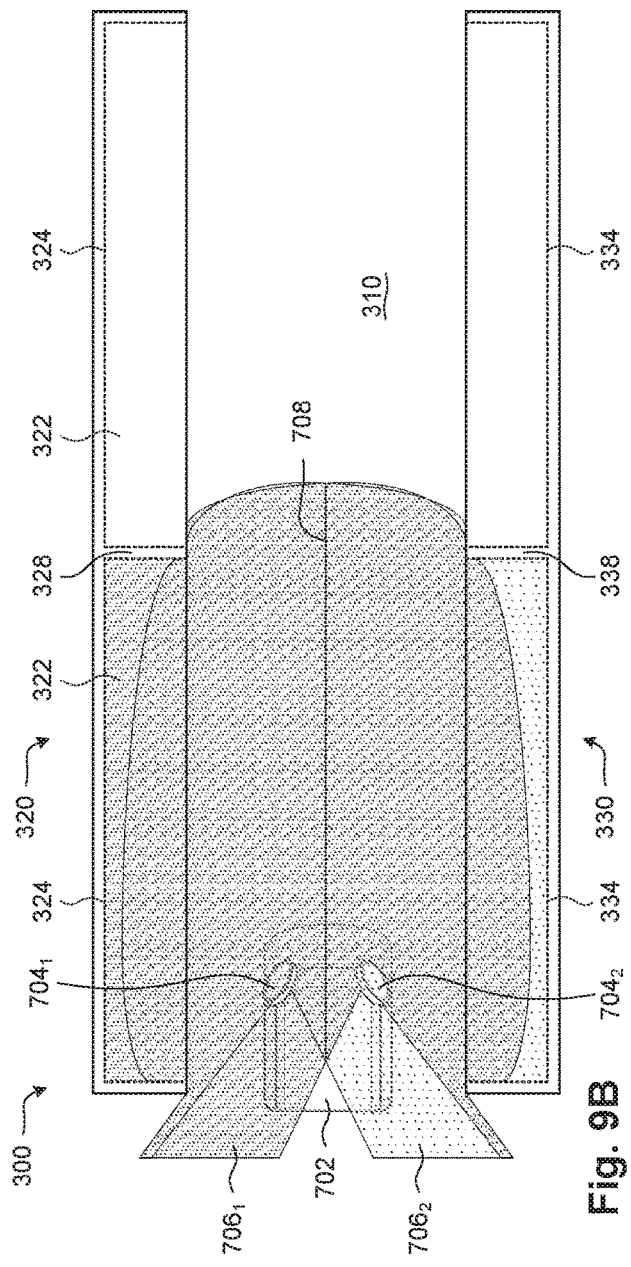

Depicted in FIGS. 9A and 9B are front and top views, respectively, of an autonomous vehicle 702 located in the environment 300. The autonomous vehicle 702 includes a planar distance sensor $704_1$ mounted on the left half of the autonomous vehicle 702 and a planar distance sensor $704_2$ mounted on the right half of the autonomous vehicle 702. The planar distance sensor $704_1$ is at a non-parallel angle with respect to the floor 310. A field $706_1$ of the planar distance sensor $704_1$ extends downward to the floor 310 to the left of a location at which the planar distance sensor $704_1$ is mounted to the left half of the autonomous vehicle 702. The field $706_1$ also extends downward to the floor 310 frontward of the front end of the autonomous vehicle 702. The planar distance sensor $704_2$ is at a non-parallel angle with respect to the floor 310. A field $706_2$ of the planar distance sensor $704_2$ extends downward to the floor 310 to the right of a location at which the planar distance sensor $704_2$ is mounted to the right half of the autonomous vehicle 702. The field $706_2$ also extends downward to the floor 310 frontward of the front end of the autonomous vehicle 702. As shown in the depicted embodiment, the non-parallel angle of the planar distance sensor $704_1$ is different than the non-parallel angle of the planar distance sensor $704_2$.

The two planar distance sensors $704_1$ and $704_2$ are arranged such that an intersecting line 708 of the planar distance sensors $704_1$ and $704_2$ is angled downward in a direction toward the floor 310 forward of the front end of the autonomous vehicle 702. In the depicted embodiment, the intersecting line 608 is also substantially parallel to a forward direction of the autonomous vehicle 702. In this arrangement, the autonomous vehicle 602 gains the benefit of being able to detect objects to the left and to the right of the autonomous vehicle 702, such as being able to detect the horizontally-protruding shelves 322 of the rack 320 and the horizontally-protruding shelves of the rack 330, and being able to detect any object on the ground frontward of the autonomous vehicle 702. In this way, the fields $706_1$ and $706_2$ of the two planar distance sensors $704_1$ and $704_2$ form a curtain that does not permit any object in front of or to the sides of the autonomous vehicle 702 to go undetected.

Another benefit to the embodiment of the autonomous vehicle 702 is the increased speed at which three-dimensional scans and/or maps of the environment 300 may be developed. Because the autonomous vehicle 702 includes two planar distance sensors $704_1$ and $704_2$, approximately twice as much data is generated by the planar distance sensors $704_1$ and $704_2$ than would be generated by a single planar distance sensor. The signals generated by the two planar distance sensors $704_1$ and $704_2$ are sent to a computing device communicatively coupled to the autonomous vehicle 702, and the computing device is configured to develop a three-dimensional scan of a portion of the environment 300 in which the autonomous vehicle 702 moves based on readings of the planar distance sensors $704_1$ and $704_2$.

Figure 10A:
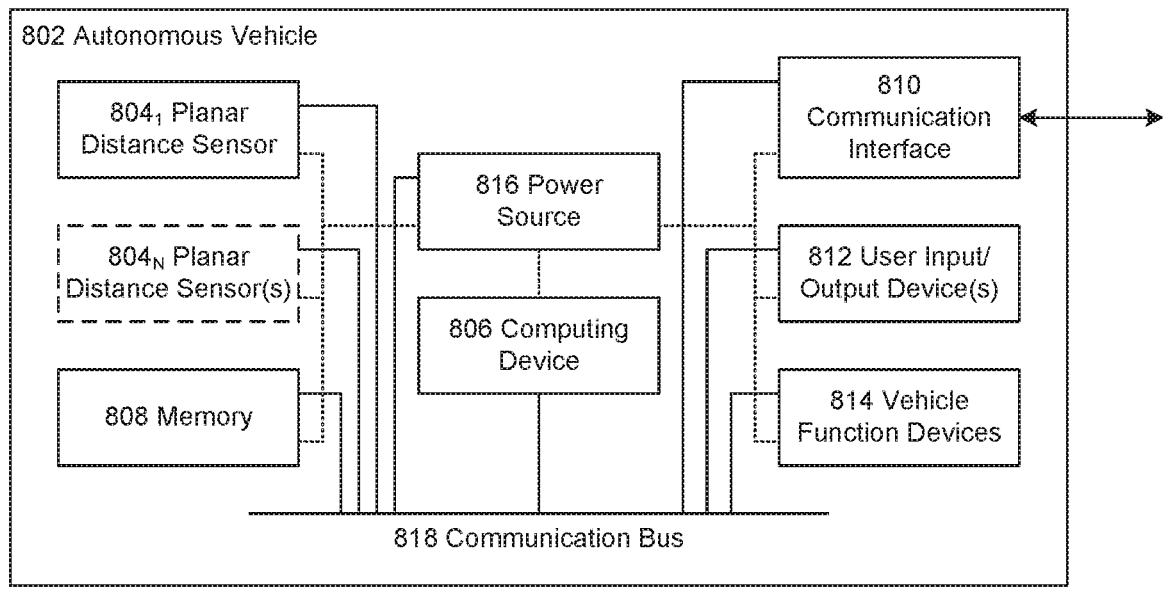
FIG. 10A depicts a block diagram of an embodiment of an autonomous vehicle, in accordance with the embodiments described herein.

Depicted in FIG. 10A is a block diagram of an embodiment of an autonomous vehicle 802. The components and interaction of components described with respect to the autonomous vehicle 802 may be implemented in any other embodiments of autonomous vehicles, including the autonomous vehicles 202, 302, 402, 502, 602, and 702. In addition, the embodiments of autonomous vehicles 202, 302, 402, 502, 602, and 702 described herein are also not limited to the components and interaction of components described with respect to the autonomous vehicle 802, but can be implemented in a number of other ways.

The autonomous vehicle 802 includes a planar distance sensor $804_1$. In some embodiments, the planar distance sensor $804_1$ is fixedly mounted to the autonomous vehicle 802 so that a field of the planar distance sensor $804_1$ is at a non-parallel angle with respect to the floor. In some embodiments, the field of the planar distance sensor $804_1$ is arranged to impinge on a surface of a horizontally-extending protrusion when the autonomous vehicle 802 is on the floor. The autonomous vehicle 802 may optionally include one or more other planar distance sensors $804_N$. In some embodiments, the other planar distance sensors $804_N$ are at a non-parallel angle with respect to the floor and at a different angle than the angle of the planar distance sensor $804_1$.

The autonomous vehicle 802 also includes a computing device 806. In some embodiments, the computing device is configured to receive signals from the planar distance sensor $804_1$ and, optionally, the other planar distance sensors $804_N$. In some embodiments, the computing device 806 is configured to develop a three-dimensional scan of horizontally-extending protrusions based on the signals from the planar distance sensor $804_1$ and/or the other planar distance sensors $804_N$ as the autonomous vehicle moves across the floor. The autonomous vehicle 802 also includes memory 808 and the computing device 806 is capable of writing information to and reading information from the memory 808. In one particular embodiment, data representative of the signals from the planar distance sensor $804_1$ and/or the other planar distance sensors $804_N$ may be written to the memory 808 and the computing device 806 may read the data from the memory 808.

The autonomous vehicle 802 also includes a communication interface 810 configured to facilitate communication of data into and out of the autonomous vehicle 802. In some embodiments, the communications interface 810 includes one or more of a WiFi transceiver, a Bluetooth transceiver, an Ethernet port, a USB port, or any other type of wired and/or wireless communication interfaces. The communications interface 810 is configured to transmit data to and receive data from computing devices and/or networks that are not included in the autonomous vehicle 802.

The autonomous vehicle 802 also includes one or more user input/output devices 812. The one or more user input/output devices 812 may include any type of input and/or output devices that permit a user input commands into or receive information from the autonomous vehicle 802. In some embodiments, the user input/output devices 812 include one or more of a push button, a toggle switch, a touchscreen display, an LED light, a microphone, a speaker, or any other input and/or output device. The user input/output devices 812 may permit a user to control operation of the autonomous vehicle 802, define settings of the autonomous vehicle 802, receive information about the autonomous vehicle 802, troubleshoot problems with the autonomous vehicle 802, and the like.

The autonomous vehicle 802 also includes vehicle functional devices 814. The vehicle functional devices 814 include any device that is capable of causing the autonomous vehicle 802 to function in a particular way. In some embodiments, the vehicle functional devices 814 include one or more motors that drive wheels of the autonomous vehicle 802 to cause it to move. In some embodiments, the vehicle functional devices 814 include a steering mechanism to control a direction of movement of the autonomous vehicle 802. In some embodiments, the vehicle functional devices 814 include a floor sweeper configured to sweep the floor on which the autonomous vehicle 802 moves. In some embodiments, the vehicle functional devices 814 include a floor polisher configured to polish the floor on which the autonomous vehicle 802 moves. In some embodiments, the vehicle functional devices 814 include a vacuum configured to vacuum the floor on which the autonomous vehicle 802 moves. The vehicle functional devices 814 can include any number of other functional devices that cause the autonomous vehicle 802 to function. In some embodiments, the computing device 806 is configured to control operation of the vehicle functional devices 814.

The autonomous vehicle 802 also includes a power source 816. The power source 816 is configured to provide power to the other components of the autonomous vehicle 802. As shown by the dashed lines in the depiction shown in FIG. 10A, the power source is coupled to and capable of providing power to each of the planar distance sensor $804_1$, the other planar distance sensors $804_N$, the computing device 806, the memory 808, the communication interface 810, the user input/output devices 812, and the vehicle function devices 814. The power source 816 may include one or more of a rechargeable battery, a non-rechargeable battery, a solar cell panel, an internal combustion engine, a chemical reaction power generator, or any other device configured to provide power to the autonomous vehicle 802 and its components.

The computing device 806 is configured to communicate with each of the other components of the autonomous vehicle 802. In the depicted embodiment, each of the planar distance sensor $804_1$, the other planar distance sensors $804_N$, the computing device 806, the memory 808, the communication interface 810, the user input/output devices 812, the vehicle function devices 814, and the power source 816 is in communication with a communication bus 818. The communication bus 818 permits communication of data, instructions, commands, and the like between any of the components of the autonomous vehicle 802. In one example, the computing device 806 can write data to the communication bus 818 for the communication interface 810 to transmit to a remote computing device. In another example, the planar distance sensor $804_1$ can write data to the communication bus 818 to be read by the computing device 806.

Figure 10B:
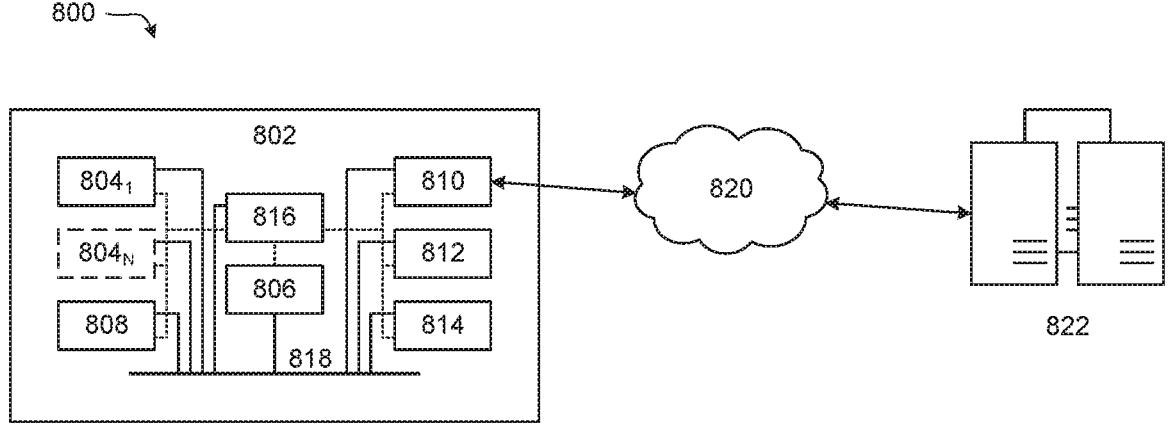
FIG. 10B depicts an embodiment of a system that includes the autonomous vehicle depicted in FIG. 10A, in accordance with the embodiments described herein.

Depicted in FIG. 10B is an embodiment of a system 800 that includes the autonomous vehicle 802. The system includes a network 820 that is in communication with the communication interface 810 of the autonomous vehicle 802. The network 820 may include a wireless network, a wired network, or any combination of wired and/or wireless networks. The system 800 also includes a remote computing device 822 that is located remotely from the autonomous vehicle 802 and is in communication with the network 820. In some embodiments, the remote computing device 822 includes a laptop computer, a desktop computer, a server, or any other type of computing device. In some embodiments, the autonomous vehicle 802 operates in a facility (e.g., a building, a campus of buildings, etc.), the network 820 includes a private network to the facility (e.g., a WiFi network associated with the facility), and the remote computing device 822 is a computing device located in the facility at a location different from the operation of the autonomous vehicle 802. In some embodiments, the autonomous vehicle 802 operates in a facility, the network 820 includes a public network (e.g., the Internet), and the remote computing device 822 is located somewhere other than the facility (e.g., in a "cloud" data center, in a facility of a distributor of the autonomous vehicle 802, etc.). It will be understood that many other arrangements of the network 820 and the remote computing device 822 are possible.

As discussed above, a computing device can develop a three-dimensional scan of a horizontally-extending protrusion as an autonomous vehicle with a planar distance sensor moves across the floor. In the system 800, the planar distance sensor $804_1$ generates signals based on distances from a horizontally-extending protrusion. In some embodiments, the computing device 806 receives the signals from the planar distance sensor $804_1$ and the computing device 806 develops a three-dimensional scan of the protrusion as the autonomous vehicle 802 moves across the floor. In some embodiments, the computing device 806 causes the communication interface 810 to transmit data based on the signals from the planar distance sensor $804_1$ to the remote computing device 822 and the remote computing device 822 develops a three-dimensional scan of the protrusion as the autonomous vehicle 802 moves across the floor. In the case where the computing device 806 is in communication with the remote computing device 822, the computing associated with developing a three-dimensional scan may be performed by any combination of the computing device 806 and the remote computing device 822.

Some of the embodiments described herein include a fixed planar distance sensor with a field that impinges on a horizontally-protruding object in the form of a shelf. However, fixed planar distance sensors at a non-parallel angle with respect to the floor are capable of impinging on any other horizontally-protruding objects. Two example embodiments of a fixed planar distance sensor with a field that impinges on horizontally-protruding objects other than shelves are depicted in FIGS. 11 and 12.

Depicted in FIG. 11 is an embodiment of an environment 900 with a floor 910 and a railing 920. The railing 920 includes upper and lower horizontal rails 922 that span between vertical posts 924. The railing 920 also includes vertical bars 926 that span between the upper and lower horizontal rails 922. The autonomous vehicle 302 is located on the floor 910 in the environment 900. The field 306 of the planar distance sensor 304 is at an angle that is not parallel to the floor 910 so that the field 306 impinges on one of the horizontal rails 922. In this way, a computing device communicatively coupled to the autonomous vehicle 302 is capable of developing a three-dimensional scan of the one of the horizontal rails 922 as the autonomous vehicle 302 moves across the floor 910. In some embodiments, the computing device communicatively coupled to the autonomous vehicle 302 is a computing device inside the autonomous vehicle 302, a computing device in communication with the autonomous vehicle 302 via a network, or any other computing device in communication with the autonomous vehicle 302.

As depicted, the field 306 impinges on the vertical posts 924 and the vertical bars 926 in addition to impinging on one of the lower horizontal rails 922. The planar distance sensor 304 is capable of generating signals indicative of the distances from the one of the lower horizontal rails 922, from each of the vertical posts 924, and from each of the vertical bars 926. In this way, as the autonomous vehicle 302 moves across the floor 910, the computing device is capable of developing a three-dimensional scan of not only the one of the horizontal rails 922 but also the vertical posts 924 and the vertical bars 926.

Figure 12:
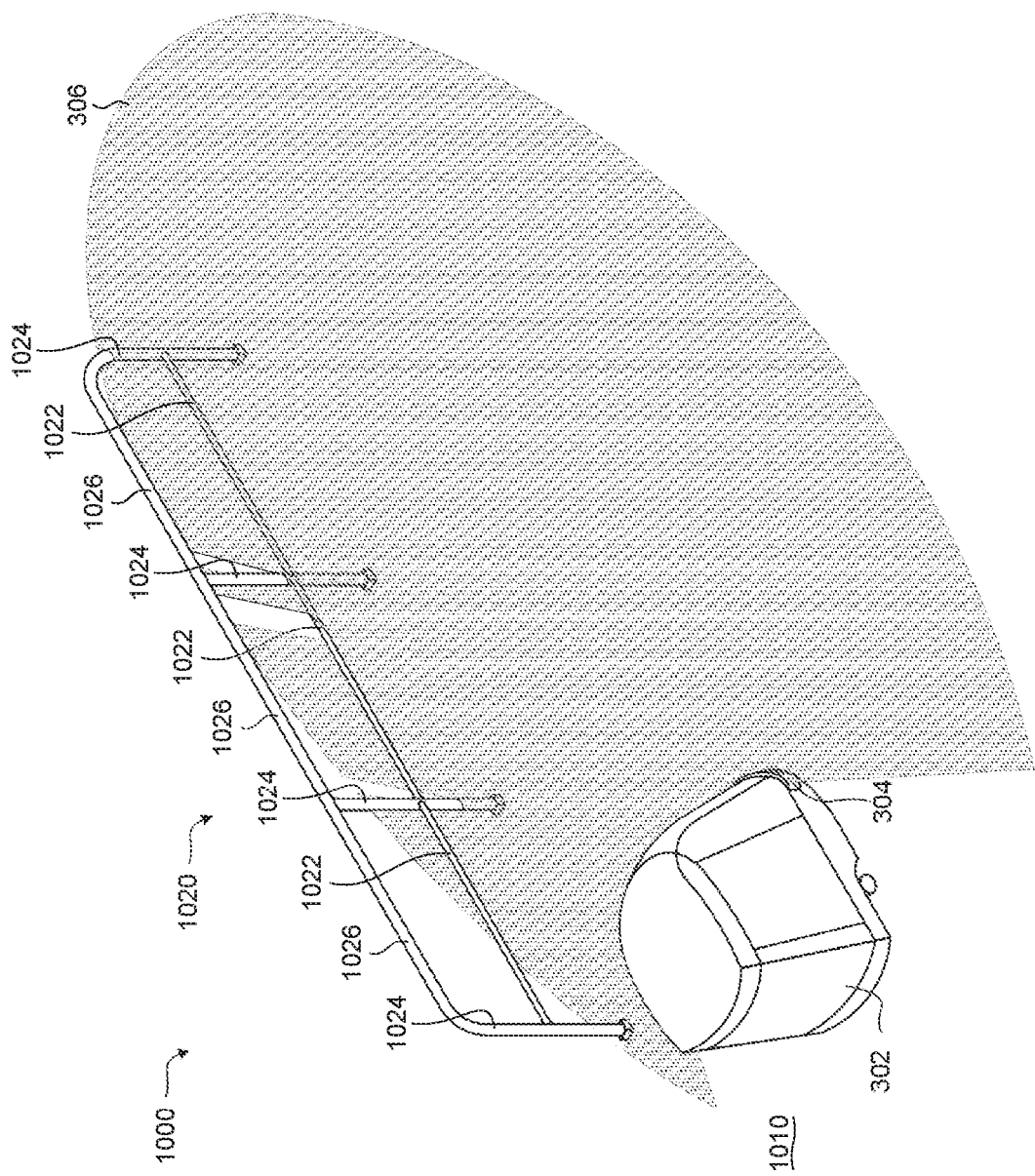
FIG. 12 depicts the autonomous vehicle shown in FIG. 4 in another embodiment of an environment where the fixed planar distance sensor of the autonomous vehicle impinges on another horizontally-protruding railing, in accordance with the embodiments described herein.

Depicted in FIG. 12 is an embodiment of an environment 1000 with a floor 1010 and a railing 1020. The railing 1020 includes lower horizontal rails 1022 that span between vertical posts 1024. The railing 1020 also includes an upper horizontal rail 1022 that spans across the tops of the vertical posts 1024. The autonomous vehicle 302 is located on the floor 1010 in the environment 1000. The field 306 of the planar distance sensor 304 is at an angle that is not parallel to the floor 1010 so that the field 306 impinges on one of the lower horizontal rails 1022. In this way, a computing device communicatively coupled to the autonomous vehicle 302 is capable of developing a three-dimensional scan of the one of the lower horizontal rails 1022 as the autonomous vehicle 302 moves across the floor 1010. In some embodiments, the computing device communicatively coupled to the autonomous vehicle 302 is a computing device inside the autonomous vehicle 302, a computing device in communication with the autonomous vehicle 302 via a network, or any other computing device in communication with the autonomous vehicle 302.

As depicted, the field 306 impinges on the vertical posts 1024 in addition to impinging on one of the lower horizontal rails 1022. The planar distance sensor 304 is capable of generating signals indicative of the distances from the one of the lower horizontal rails 1022 and from each of the vertical posts 1024. In this way, as the autonomous vehicle 302 moves across the floor 1010, the computing device is capable of developing a three-dimensional scan of not only the one of the horizontal rails 1022 but also the vertical posts 1024.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system for three-dimensional scanning in an environment containing a protrusion that extends substantially parallel to a floor, the system comprising:
   an autonomous vehicle configured to be located on the floor and to move across the floor;
   a planar distance sensor, the planar distance sensor having a laser emitting an electromagnetic energy in a field within the plane of the planar distance sensor, the distance sensor being configured to sense distances of objects from the planar distance sensor in at least a portion of a plane and further emitting electromagnetic energy in a field within a plane of the planar distance sensor, the planar distance sensor fixedly mounted to the autonomous vehicle at a front end of the autonomous vehicle in a bottom half of the autonomous vehicle, wherein the planar distance sensor emits electromagnetic energy forward and rearward with respect to the sensor, wherein a field of view of the planar distance sensor is at a non-parallel angle with respect to the floor when the autonomous vehicle is on the floor, wherein the field of view of the planar distance sensor impinges on a surface of the protrusion when the autonomous vehicle is on the floor; and
   wherein the field of view may extend upward, downward, or laterally; and
   a computing device communicatively coupled to the autonomous vehicle and configured to develop a three-dimensional scan of the protrusion as the autonomous vehicle moves across the floor.

2. The system of claim 1, wherein the field of view of the planar distance sensor extends away from the floor frontward of the front end of the autonomous vehicle.

3. The system of claim 2, wherein the surface of the protrusion is a bottom surface of the protrusion, and wherein a portion of the field of view of the planar distance sensor extends away from the floor frontward of the front end of the autonomous vehicle until it impinges on the bottom surface of the protrusion.

4. The system of claim 1, wherein the field of view of the planar distance sensor extends downward to the floor behind the front end of the autonomous vehicle.

5. The system of claim 4, wherein the computing device is further configured to develop a three-dimensional scan of the floor as the autonomous vehicle moves across the floor.

6. The system of claim 1, wherein the field of view of the planar distance sensor is substantially perpendicular to the floor.

7. The system of claim 6, wherein the field of view of the planar distance sensor passes above a top of the autonomous vehicle, and wherein the field of the planar distance sensor is not parallel to a forward movement direction of the autonomous vehicle.

8. The system of claim 1, wherein the protrusion is a shelf in a rack of shelves.

9. The system of claim 8, wherein the computing device is further configured to develop a three-dimensional scan of a plurality of shelves in the rack of shelves as the autonomous vehicle moves across the floor.

10. The system according to claim 1 wherein the laser emits electromagnetic energy at a frequency range selected from the from the group consisting of an ultraviolet range, a visible light range, and an infrared range.

11. A planar scanning system for use with an autonomous vehicle, the autonomous vehicle configured to move across a floor, wherein the autonomous vehicle has front and back ends, the planar scanning system comprising:
   a first planar distance sensor, the planar distance sensor having a laser emitting an electromagnetic energy in a field within the plane of the planar distance sensor, the laser emitting a planar electromagnetic energy in a field within a plane of the planar distance sensor, the first planar distance sensor being mounted on a first half of the autonomous vehicle, wherein a field of view of the first planar distance sensor is at a first non-parallel angle with respect to the floor; and
wherein the field of view extends upward, downward, laterally, and rearward;
a second planar distance sensor mounted on a second half of the autonomous vehicle, wherein a field of view of the second planar distance sensor is at a second non-parallel angle with respect to the floor; and
wherein the field of view may extend upward, downward, or laterally; and
a computing device communicatively coupled to the first and second planar distance sensors, the computing device configured to develop a three-dimensional scan of a portion of an environment in which the autonomous vehicle moves based on readings of the first and second planar distance sensors;
wherein the first non-parallel angle and the second non-parallel angle are different from each other and the first and second planar distance sensors are arranged such that an intersecting line of the field of view of the first planar distance sensor and the field of the second planar distance sensor is forward of the front end of the autonomous vehicle.

12. The planar scanning system of claim 11, wherein the first planar distance sensor is mounted to a top half of the autonomous vehicle, and wherein the field of view of the first planar distance sensor extends toward the floor frontward of a location at which the first planar distance sensor is mounted to the top half of the autonomous vehicle.

13. The planar scanning system of claim 12, wherein the second planar distance sensor is mounted to a bottom half of the autonomous vehicle, and wherein the field of view of the second planar distance sensor extends away from the floor frontward of a location at which the second planar distance sensor is mounted to the bottom half of the autonomous vehicle.

14. The planar scanning system of claim 13, wherein the intersecting line of the field of view of the first planar distance sensor and the field of view of the second planar distance sensor is substantially parallel to the floor and substantially perpendicular to a forward direction of the autonomous vehicle.

15. The planar scanning system of claim 11, wherein the first planar distance sensor is mounted to a right half of the autonomous vehicle, and wherein the field of view of the first planar distance sensor extends downward to the floor to the right of a location at which the first planar distance sensor is mounted to the right half of the autonomous vehicle.

16. The planar scanning system of claim 15, wherein the second planar distance sensor is mounted to a left half of the autonomous vehicle, and wherein the field of view of the second planar distance sensor extends downward to the floor to the left of a location at which the second planar distance sensor is mounted to the left half of the autonomous vehicle.

17. The planar scanning system of claim 11, wherein the intersecting line is substantially perpendicular to a forward direction of the autonomous vehicle and substantially parallel to the floor.

18. The planar scanning system of claim 11, wherein the intersecting line is angled downward in a direction toward the floor forward of the front end of the autonomous vehicle.

19. The system according to claim 11 wherein the laser emits electromagnetic energy at a frequency range selected from the from the group consisting of an ultraviolet range, a visible light range, and an infrared range.

* * * * *